(12) United States Patent
LaBine et al.

(10) Patent No.: US 8,887,063 B2
(45) Date of Patent: Nov. 11, 2014

(54) DESKTOP SHARING METHOD AND SYSTEM

(75) Inventors: David LaBine, Calgary (CA); Mark Altosaar, Calgary (CA); Daniel Mitchell, Calgary (CA); Wojtek Quibell, Calgary (CA)

(73) Assignee: SMART Technologies ULC (CA)

( * ) Notice: Subject to any disclaimer, the term of this patent is extended or adjusted under 35 U.S.C. 154(b) by 985 days.

(21) Appl. No.: 12/125,018

(22) Filed: May 21, 2008

(65) Prior Publication Data

US 2009/0292999 A1    Nov. 26, 2009

(51) Int. Cl.
| | |
|---|---|
| G06F 3/00 | (2006.01) |
| G06F 3/048 | (2013.01) |
| H04L 12/18 | (2006.01) |
| G06F 3/14 | (2006.01) |

(52) U.S. Cl.
CPC .......... *G06F 3/1454* (2013.01); *H04L 12/1827* (2013.01)
USPC ............ 715/750; 715/810; 715/764; 715/762

(58) Field of Classification Search
USPC .......................................... 715/750, 810, 764
See application file for complete search history.

(56) References Cited

U.S. PATENT DOCUMENTS

| | | | | |
|---|---|---|---|---|
| 5,838,300 | A * | 11/1998 | Takagi et al. ................... | 715/700 |
| 6,137,473 | A | 10/2000 | Cortopassi et al. | |
| 6,334,150 | B1 * | 12/2001 | Cromer et al. ................ | 709/223 |
| 6,353,449 | B1 * | 3/2002 | Gregg et al. ................... | 715/762 |
| 6,584,493 | B1 * | 6/2003 | Butler ........................... | 709/204 |
| 6,686,933 | B1 * | 2/2004 | Tang et al. .................... | 715/751 |
| 6,934,737 | B1 * | 8/2005 | Tang et al. .................... | 709/204 |
| 6,972,401 | B2 | 12/2005 | Akitt et al. | |
| 7,692,625 | B2 | 4/2010 | Morrison et al. | |
| 7,694,809 | B2 * | 4/2010 | Garbini et al. ................ | 206/364 |
| 2002/0075160 | A1 * | 6/2002 | Racz et al. ............... | 340/825.69 |
| 2003/0067387 | A1 | 4/2003 | Kwon et al. | |
| 2005/0076102 | A1 | 4/2005 | Chen et al. | |
| 2005/0097506 | A1 | 5/2005 | Heumesser | |
| 2006/0010392 | A1 * | 1/2006 | Noel et al. .................... | 715/759 |
| 2006/0020665 | A1 * | 1/2006 | Hagale et al. ................. | 709/204 |
| 2006/0041655 | A1 * | 2/2006 | Holloway et al. ............. | 709/223 |

(Continued)

FOREIGN PATENT DOCUMENTS

| | | |
|---|---|---|
| CN | 1412686 A | 4/2003 |
| CN | 1647062 A | 7/2005 |

(Continued)

OTHER PUBLICATIONS

International Preliminary Report on Patentability for International Application No. PCT/CA2009/000698, with an issuance date of Nov. 23, 2010.

(Continued)

*Primary Examiner* — Amy Ng
*Assistant Examiner* — Erik Stitt
(74) *Attorney, Agent, or Firm* — Katten Muchin Rosenman LLP

(57) ABSTRACT

In a distributed computer network where displayed information is shared between at least two computers, a method of enabling remote control of a host computer having a display region that is to be shared with at least one client computer. The method includes tracking time lapsed since a local user input event has occurred while the host computer is under local control and in the event that the time lapsed exceeds a threshold, enabling remote control of the host computer by a client computer.

11 Claims, 22 Drawing Sheets

(56) References Cited

U.S. PATENT DOCUMENTS

| | | | |
|---|---|---|---|
| 2006/0168533 A1* | 7/2006 | Yip et al. | 715/753 |
| 2007/0255788 A1 | 11/2007 | Troung et al. | |
| 2008/0065996 A1* | 3/2008 | Noel et al. | 715/753 |
| 2008/0091778 A1 | 4/2008 | Ivashin et al. | |
| 2008/0235596 A1* | 9/2008 | Bhogal et al. | 715/743 |
| 2009/0213205 A1* | 8/2009 | Ivashin et al. | 348/14.08 |
| 2009/0228801 A1* | 9/2009 | Lee et al. | 715/730 |
| 2009/0281676 A1* | 11/2009 | Beavis et al. | 700/295 |
| 2009/0300510 A1* | 12/2009 | Gantman et al. | 715/740 |

FOREIGN PATENT DOCUMENTS

| | | | | |
|---|---|---|---|---|
| EP | 0636978 B1 * | 7/1993 | | G06F 9/46 |
| WO | 2007/053304 A2 | 5/2007 | | |
| WO | 2007/053304 A3 | 5/2007 | | |

OTHER PUBLICATIONS

International Search Report and Written Opinion for International Application No. PCT/CA2009/000698, with a mailing date of Sep. 1, 2009.

SMART Bridgit (TM) Conferencing Software, SMART Technologies ULC, 2010.

Zhi-Hua Li et al., "Research and realization of technologies in distributed synchronous cooperative design system", Mechanical & Electrical Engineer Magazine, vol. 24, No. 2, Feb. 2007.

Sep. 29, 2012 Office Action for Chinese Patent Application No. 200980118654.1, published as 100140.

Supplementary European Search Report for European Patent Application No. 09 74 9370, with a completion date of Oct. 10, 2011.

* cited by examiner

DESKTOP SHARING METHOD AND SYSTEM

FIELD OF THE INVENTION

The present invention relates generally to data sharing among different computers and in particular to a method and system for enabling remote control of a host computer having a display region that is to be shared with at least one other computer.

BACKGROUND OF THE INVENTION

Networked computer systems including computers executing desktop sharing applications to permit the computers to share displayed information are widely known and used. In these computer systems, one computer (the host computer) transmits images of its desktop to a plurality of remote computers using such a desktop sharing application. The remote computers may use a variety of strategies to display the host computer desktop images depending on the operating environments of the remote computers.

Windows is a well-known operating environment for computers. In this operating environment, information to be presented to a user is displayed by a desktop graphical user interface in one or more windows. In computer systems that share displayed information and operate in the Windows environment, when images of the host computer desktop are transmitted to the remote computers via a conferencing server, each remote computer displays the host computer desktop image within a window. Such desktop sharing requires a large, stable network connection between each of the personal computers and the conferencing server, especially where other applications, such as video conferencing, are run at the same time.

In some instances, it is desirable to permit remote control by a remote computer of a particular host computer having a shared display region. Web conferencing software such as Bridgit™ provided by SMART Technologies ULC of Calgary, Alberta, Canada enable a user during a conference to, while sharing a desktop, permit contributions via remote control to the desktop via other client computers during the conference. Typically this is done by a remote user manually requesting remote control of the shared desktop via menu selection. In response, the user of the host computer receives a pop-up or other notification, and the user of the host computer then chooses whether to grant or deny the request for remote control of the desktop. Upon grant of remote control, keyboard and mouse commands are routed from the remote controller computer via the computer network to the host computer.

It has been found that the manual request and explicit grant/deny process is cumbersome for users, as it can interrupt and thereby frustrate the collaborative process supported by the computer network. This disadvantage is encountered in other systems such as those provided by Microsoft, WebEx, Adobe and VNC, to name a few.

As will be appreciated, improvements in graphical user interfaces in environments where computers share displayed information are desired. It is therefore an object of the present invention to provide a novel method and system for enabling remote control of a first computer having a display region that is to be shared with at least one other computer.

SUMMARY OF THE INVENTION

According to one aspect there is provided, in a distributed computer network where displayed information is shared between at least two computers, a method of enabling remote control of a host computer having a display region that is to be shared with at least one client computer, comprising:

while the host computer is under local control, tracking time lapsed since a local user input event has occurred;

in the event that the time lapsed exceeds a threshold, enabling remote control of the host computer by a client computer.

According to another aspect, there is provided a desktop sharing application, comprising:

a shared display region;

said desktop sharing application being dynamically conditionable between a host mode, wherein said shared display region displays a shared region of the desktop of a host computer upon which the desktop sharing application is executing, and a client mode, wherein said shared display region displays a shared region of the desktop of a client computer executing the desktop sharing application conditioned in host mode with which said desktop sharing application is in communication;

said desktop sharing application in said host mode tracking time lapsed since a local user input event on said host computer and in the event that time lapsed exceeds a threshold, enabling remote control of said host computer by a client computer.

According to yet another aspect, there is provided, in a distributed computer network where displayed information is shared between at least two computers, a method of remotely controlling a shared desktop comprising:

sharing a region of a desktop on a host computer with a client computer;

receiving a request from the client computer to remotely control the host computer's desktop; and in the event that a time lapsed since a local user input activity on the host computer has exceeded a threshold, enabling remote control of the host computer by the client computer.

The time lapse mechanism for enabling remote control is advantageous in that it mimics the natural pause in conversation that occurs after someone speaks that indicates the floor is open for other speakers/contributors. The time lapse mechanism is more intuitive for users collaborating in a conferencing or other environment than previously-known mechanisms that require the local user of the host computer to click on a dialog box to grant permission to another user to remotely control to host computer. Even with this useful mechanism, according to embodiments the local user of the host computer retains ultimate control over the host computer by being able to adjust conference settings to specify whether remote control of the host computer is enabled at all, and to resume control of the host computer from a remote controller at any time.

BRIEF DESCRIPTION OF THE DRAWINGS

Embodiments of the present invention will now be described, by way of example only, with reference to the attached drawings in which.

DETAILED DESCRIPTION OF THE INVENTION

Figure 1:
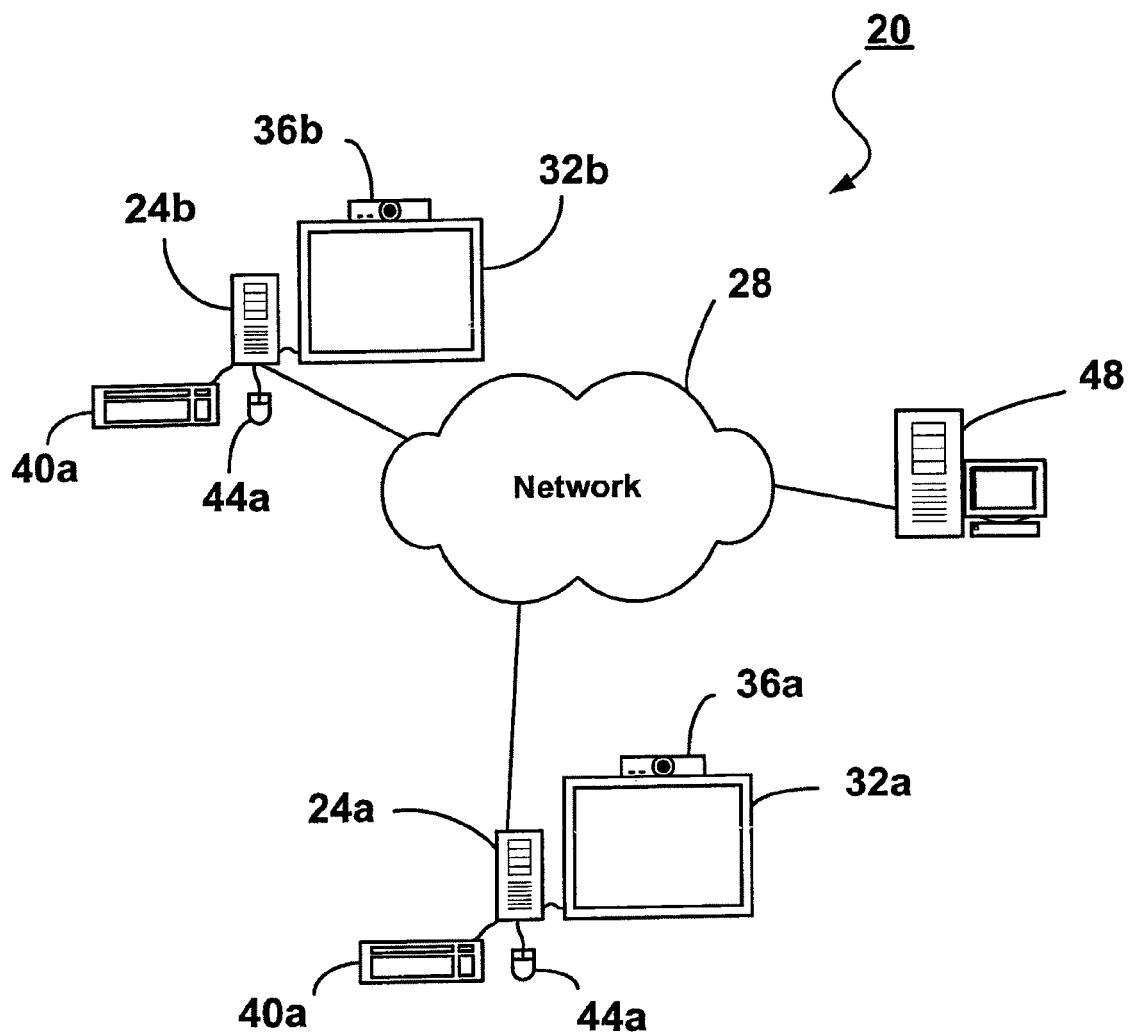
FIG. 1 shows a schematic representation of a typical network topology in which the present invention is employed.

Turning to FIG. 1, an exemplary computing environment 20 is shown and includes a pair of computers 24a, 24b communicating over a communication network 28. The computers 24a, 24b communicate with touch screens 32a, 32b of the type described in U.S. patent application Ser. No. 10/312,983 to Morrison, et al. and U.S. patent application Ser. No. 10/354,168 to Akitt, et al., the contents of which are incorporated herein by reference. The computers 24a, 24b also communicate with web cameras 36a, 36b (referred to hereinafter as "webcams"), keyboards 40a, 40b and mice 44a, 44b. Each of the computers 24a, 24b is also in communication with a conferencing server 48 via the communication network 28. Those of skill in the art will appreciate that two computers are shown for ease of illustration. In a typical conferencing environment, many computers will communicate over the communication network 28.

Each of the personal computers 24a and 24b operates in a Windows environment and includes a desktop. As used herein, "desktop" means the graphical user interface of an operating system and applications displayed on a monitor. This includes, but is not limited to, the "desktop" of an operating system, controls such as taskbars and scroll bars, any icons and application windows.

The desktop allows information to be presented to a user in windows. Each personal computer runs a desktop sharing application that permits the personal computers 24a and 24b to share displayed information. In this particular example, the personal computers 24a and 24b run SMART Bridgit Conferencing Software. This desktop sharing application allows a conference to be set up between personal computers with one personal computer at a time being designated as a host, or "presenter" computer and the remaining personal computers being designated as client, or "participant" computers. Images of the host computer desktop are transmitted to the client computers in the conference via the conferencing server 48 and are displayed on the monitors of the client computers full screen. In the environment of FIG. 1, the host computer desktop is presented on the touch screens 32a and 32b. The client computers can be enabled to control the host computer to a degree, as will be described.

Both the host and client computers are in communication with the conferencing server 48 via SSL connections to provide security for any sensitive information being transmitted.

Figure 2:
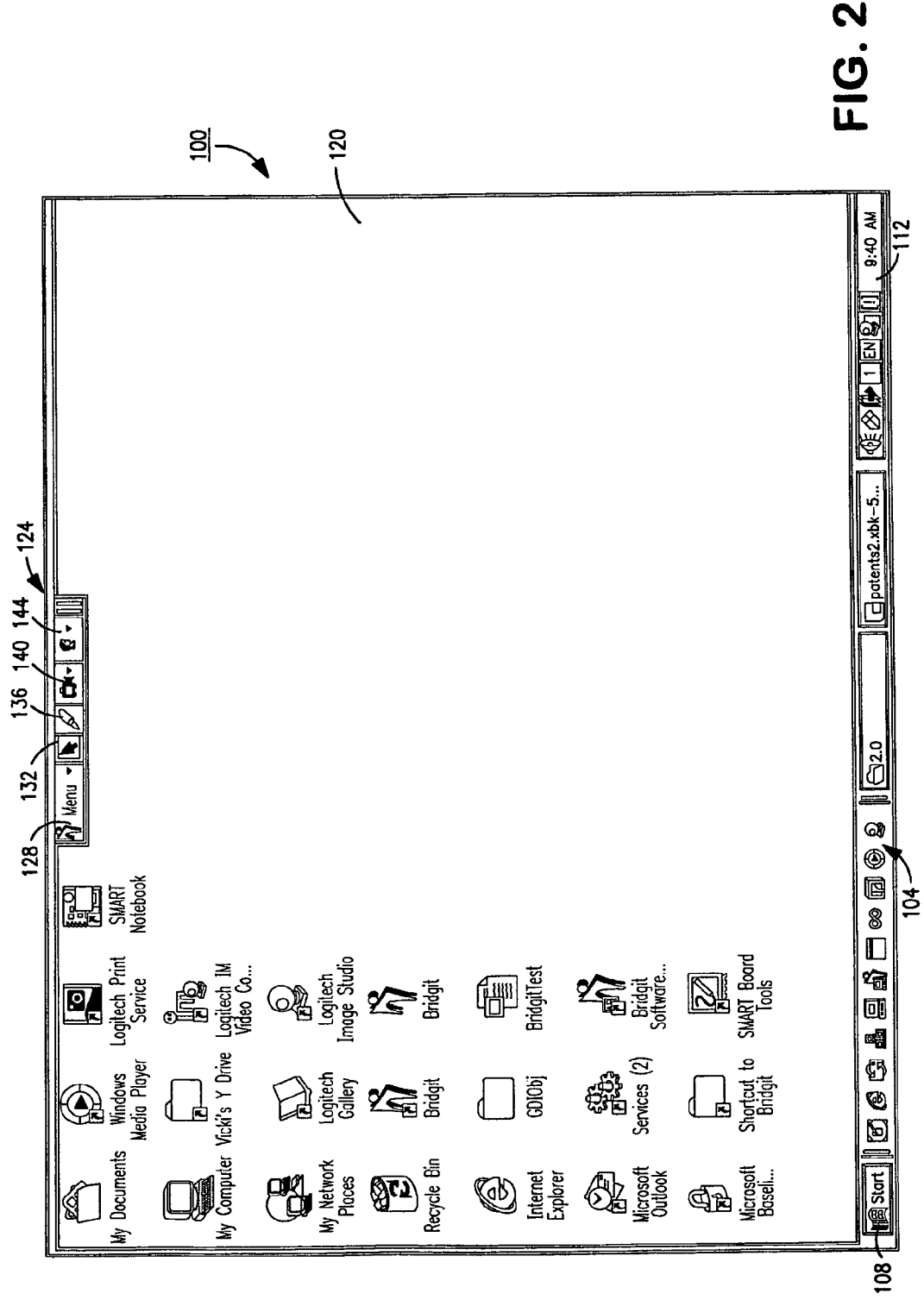
FIG. 2 shows a presenter's graphical user interface ("GUI") of a desktop sharing application in accordance with the present invention.

FIG. 2 shows the graphical user interface ("GUI") 100 of the desktop sharing application running on the host computer. The GUI 100 comprises a window on the desktop of the operating system. The desktop of the operating system includes a taskbar 104 providing access to a set of functionality through a program menu button 108 and a notification area 112. The GUI 100 is shown having a shared region 116 defined by a frame 120. A toolbar 124 is shown anchored to the top of the frame and includes a set of buttons, including a main menu button 128, a pointer option button 132, a drawing option button 136, a webcam menu button 140 and a participants list button 144.

The frame 120 of the GUI 100 can be adjusted as desired to select the initial shared region 116 of the desktop for the conference. In this manner, the host or presenter can control the portions of the host computer's desktop that are transmitted to client computers and presented to viewers. It can be desirable in some circumstances to manipulate the frame 120 to exclude sensitive controls from the shared region, thereby ensuring that other participants are not granted access to them. Only one of the pointer option button 132 and the drawing option button 136 can be selected at one time. In this example, the pointer option button 132 is selected, indicating that pointer input will be interpreted as mouse pointer events. When the drawing option button 136 is selected, pointer input is interpreted as drawing events. The participants list button 144 can be toggled to display or hide a list of participants in the conference. In this list, the presenter is identified with the word "presenter" appearing below his name.

Figure 3:
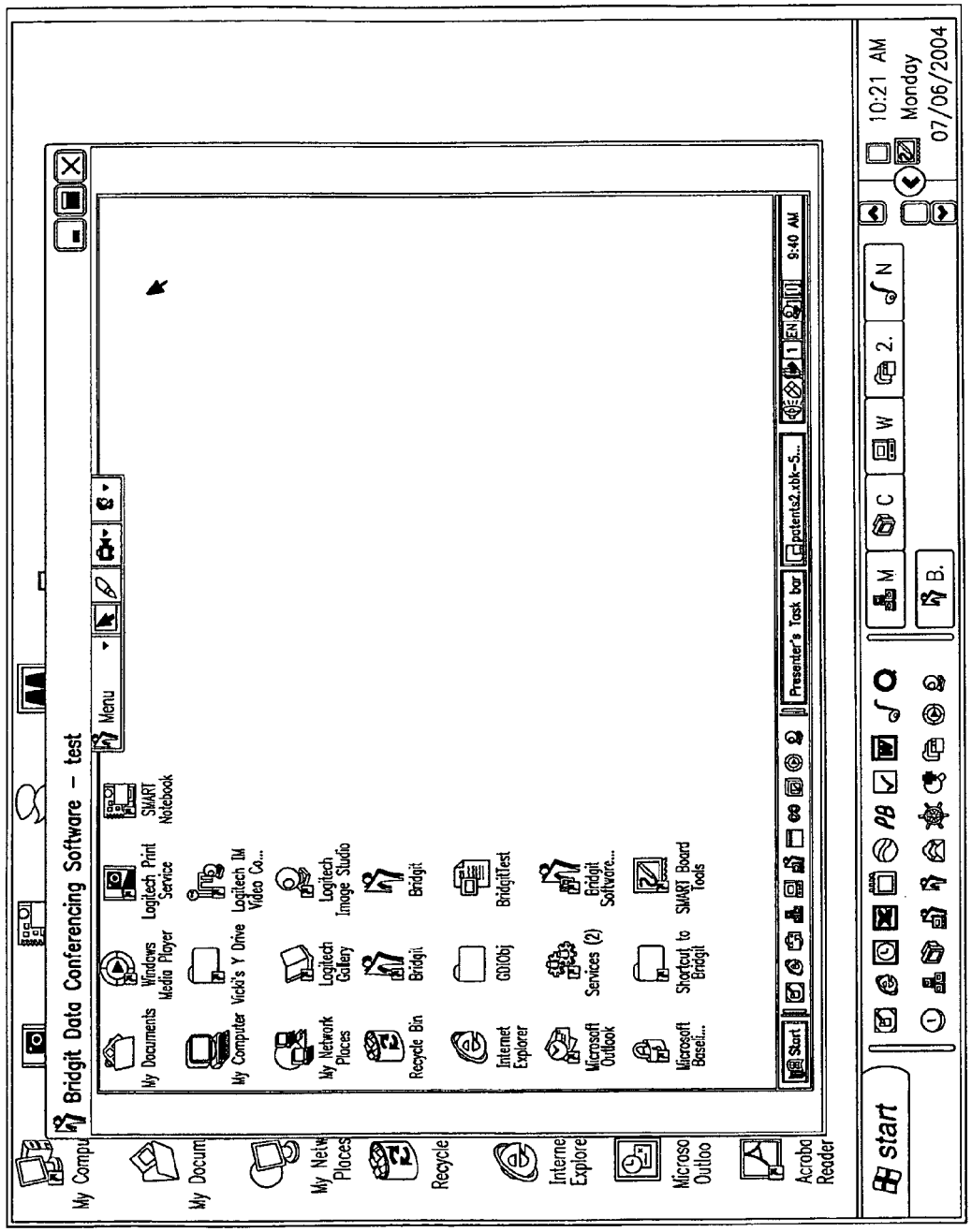
FIG. 3 shows a viewer's GUI corresponding to the presenter's GUI of FIG. 2.

FIG. 3 shows the GUI 100 as it appears to a non-presenting participant or viewer. The GUI 100 takes the form of a window overlying the client computer's desktop. The GUI 100 shows the shared region 116 of the presenter's desktop, and has the same toolbar 124 shown. In this example, the presenter has elected not to allow viewers to control remotely the presenter's desktop. As a result, certain areas of the shared region 116, such as the taskbar 104, are hatched to indicate to the viewer that the taskbar is that of the presenter and not that on his desktop, and that interaction with the taskbar is not possible.

The presenter can optionally select to hatch or entirely hide windows associated with particular programs. For example, where an instant messaging client is installed on the presenter's computer, it can be desirable to hide message windows as sensitive and/or personal information may be contained in these windows. Also, where an application provides a distracting or erratic interface, it can be desirable to hide the application's window. A further example of an application to be hidden is the task manager that can appear in a window on the desktop as the task manager generally provides administrative control over the computer. The presenter can select to open a dialog box (not shown) that presents a list of applications presently executing and select to hide specific applications by clicking on the application name. These settings for each application can be retained until the presenter elects to modify them. While this window may not contain sensitive information, it can be desirable to hatch the window in order to prevent providing viewers potentially with remote administrative privileges on the presenter's computer in situations where remote viewers are given remote control access.

The viewers can elect to display the shared region 116 in a window or full screen. In either case, the shared region can be scaled accordingly or can be displayed in its original size. In this situation, scroll bars and other like navigational controls are provided to enable the viewers to view hidden portions of the shared region.

The color of the frame 120 of the GUI 100 changes for both the presenter and the viewers to reflect the control state of the presentation. When the presenter has selected to deny remote control access to viewers, the frame 120 appears in blue to the presenter and in green to the viewers. When the presenter has selected to grant remote control access to viewers, the frame 120 appears in red to the presenter and to the viewers.

The presenter can manually position the toolbar 124 at any point along the interior edge of the frame 120. When the presenter moves the toolbar 124, the toolbar 124 displayed to the viewers tracks the presenter's toolbar's movement. This allows the presenter to control what the viewers see to ensure that important information is not hidden.

Various balloon tips stemming from the toolbar 124 are provided during the course of a conference. The balloon tips announce when a participant has joined or left the conference as well as other important events. The participant has the option to turn off these balloon tips. In addition, audio cues can be optionally used in a similar manner, either alone or in conjunction with the balloon tips.

Figure 4:
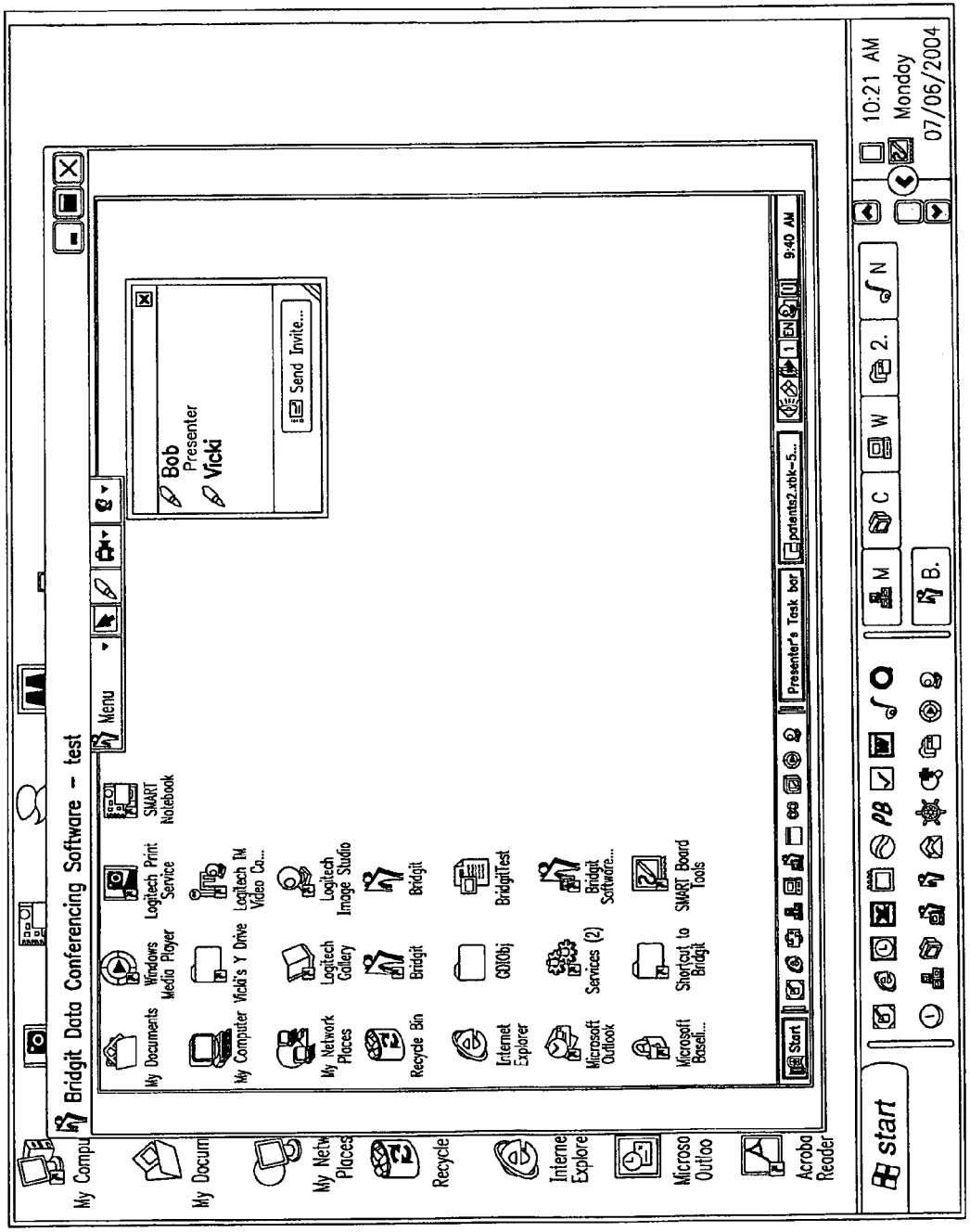
FIG. 4 shows the viewer's GUI, wherein the presenter has revealed a conference participant list.

FIG. 4 shows the GUI 100 of the desktop sharing application presented to a viewer, wherein the presenter has opened a participants list 148 by clicking on the participants list button 144 in order to invite another participant to the conference. The participants list 148 lists the participants of the conference by name, indicating who is presenting, and includes a "send invite" button 152 for inviting other participants to the conference.

Figure 5:
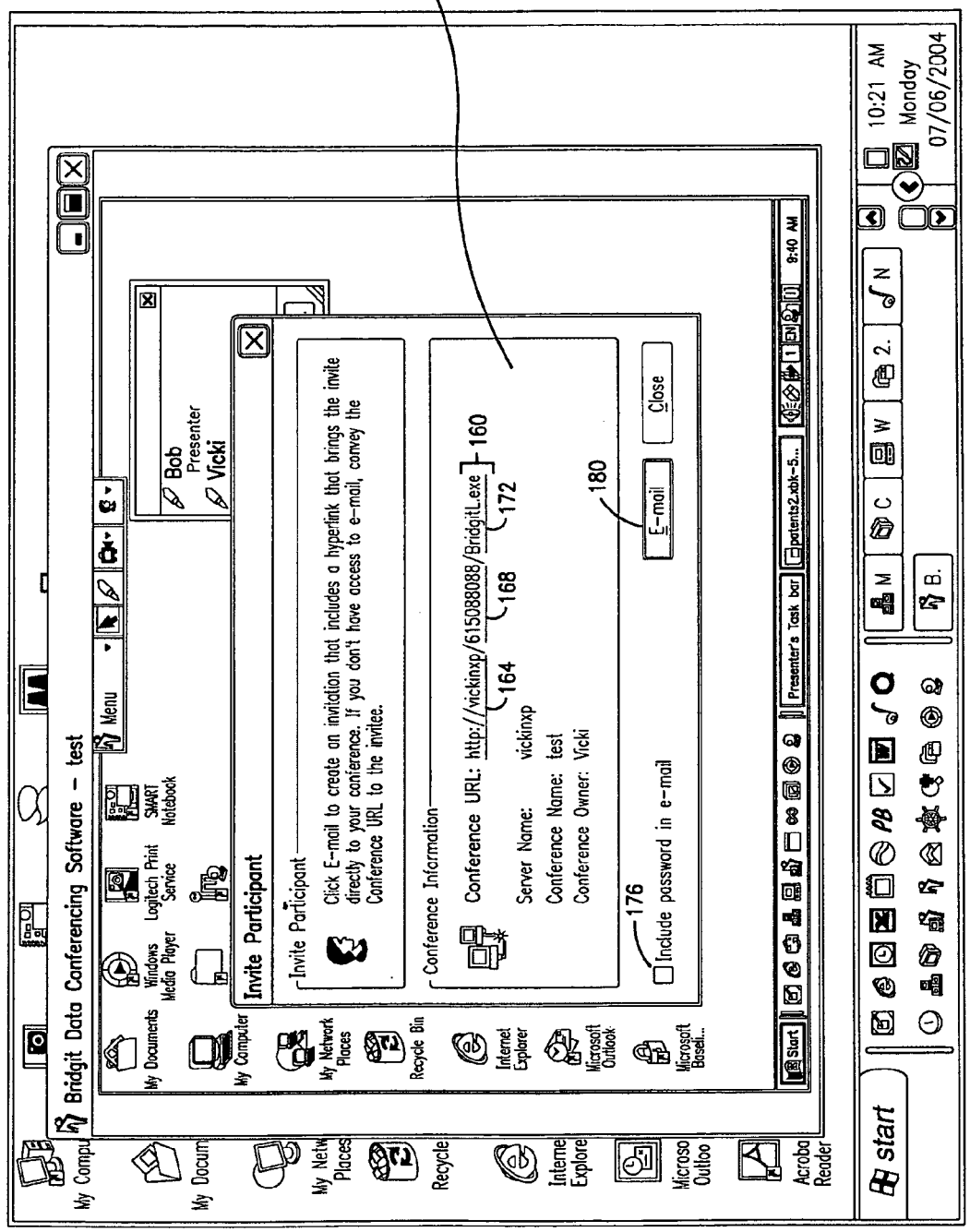
FIG. 5 shows the viewer's GUI, wherein the presenter has invited another participant to the conference via selection of an invite button shown in FIG. 4.

FIG. 5 shows a dialog box 156 that appears when the "send invite" button 152 is selected. The dialog box 156 displays a conference URL link 160 that includes the conferencing server's address 164, a conference ID 168, and a file reference link 172 to a loader application. The conference ID 168 is a unique identifier that is generated for the conference. Further, the dialog box 156 includes a checkbox 176 and an "E-mail" button 180. The checkbox 176 can be selected to include the password for the conference with an email that is sent to the invited participant, where a conference is password-protected. When the "E-mail" button 180 is selected, an email form is opened with the appropriate instructions. The conference URL 160 and the password for the conference, if appropriate, are inserted into the message body of the email form. As a result, in order to complete the invitation, a user only needs to insert the email address(es) of the conference invitee(s). The invitation is then ready to be sent.

When an invitee receives an emailed invitation, in order to join the conference, the invitee, after opening the email, simply needs to click on the conference URL link 160 presented in the email message. The conference URL link 160 refers to a file that is to be accessed via HyperText Transport Protocol ("HTTP"). As a result, the default Web browser is launched on the invitee's computer to download the specified file. When the Web browser connects to the conferencing server specified by the fully-qualified address 164, the conferencing server retrieves a browser cookie from the invitee's computer and inserts into it the address of the conferencing server 48 and the conference ID 168. The name of the browser cookie itself corresponds to the Internet address, either a fully-qualified domain name or an IP address, of the conferencing server. If the invitee's computer has never visited the conferencing server, the conferencing server will not find a corresponding browser cookie. As a result, the conferencing server creates a browser cookie and inserts into it a header identifying the cookie as storing the conferencing server's address and the conference ID, along with the address of the presenter's computer. The conferencing server then returns the browser cookie to the invitee's computer for storage in a browser cookie directory.

In addition, the conferencing server 48 returns a small loader application. When the loader application has been received by the invitee's computer and executed, it determines if the desktop sharing application has been installed on the invitee's computer. When the desktop sharing application is downloaded to a computer, it is stored by the loader application in a specific system directory. If the desktop sharing application is not detected in this system directory by the loader application, the loader application downloads the desktop sharing application from the conferencing server 48 and saves it to the specific system directory.

Once the desktop sharing application is located in the system directory, the loader application searches the directory in which browser cookies are maintained by the Web browser for the browser cookie associated with the conferencing server. As more than one conferencing server can exist, and each conferencing server is associated with a unique Internet address that is not known a priori, the loader application examines the browser cookies in the browser cookie directory in descending date order based on the modified date field until a browser cookie having a header identifying it as storing the conferencing server's address and the conference ID is located. While a Web site with which a Web browser is communicating can only retrieve its own browser cookie from the browser cookie directory of a computer, the loader application is able to access all of the cookies as it is executed locally on the invitee's computer.

When the most recently modified browser cookie that contains the conferencing server's address and the conference ID is located, the loader application reads and registers this information.

The loader application then launches the desktop sharing application via a command line command that includes the conferencing server's address and the conference ID as parameters. The desktop sharing application then uses this information to immediately connect to the conference specified by the parameters. As a result, the conference is connected to without requiring user input, such as manual entry of the conferencing server name and selection of the conference.

As the conference ID 168 is unique to the conference for which it was generated, subsequent attempts to use the information stored in the browser cookie to connect to the conference results in the desktop sharing application simply being connected to the conferencing server specified.

Figure 6:
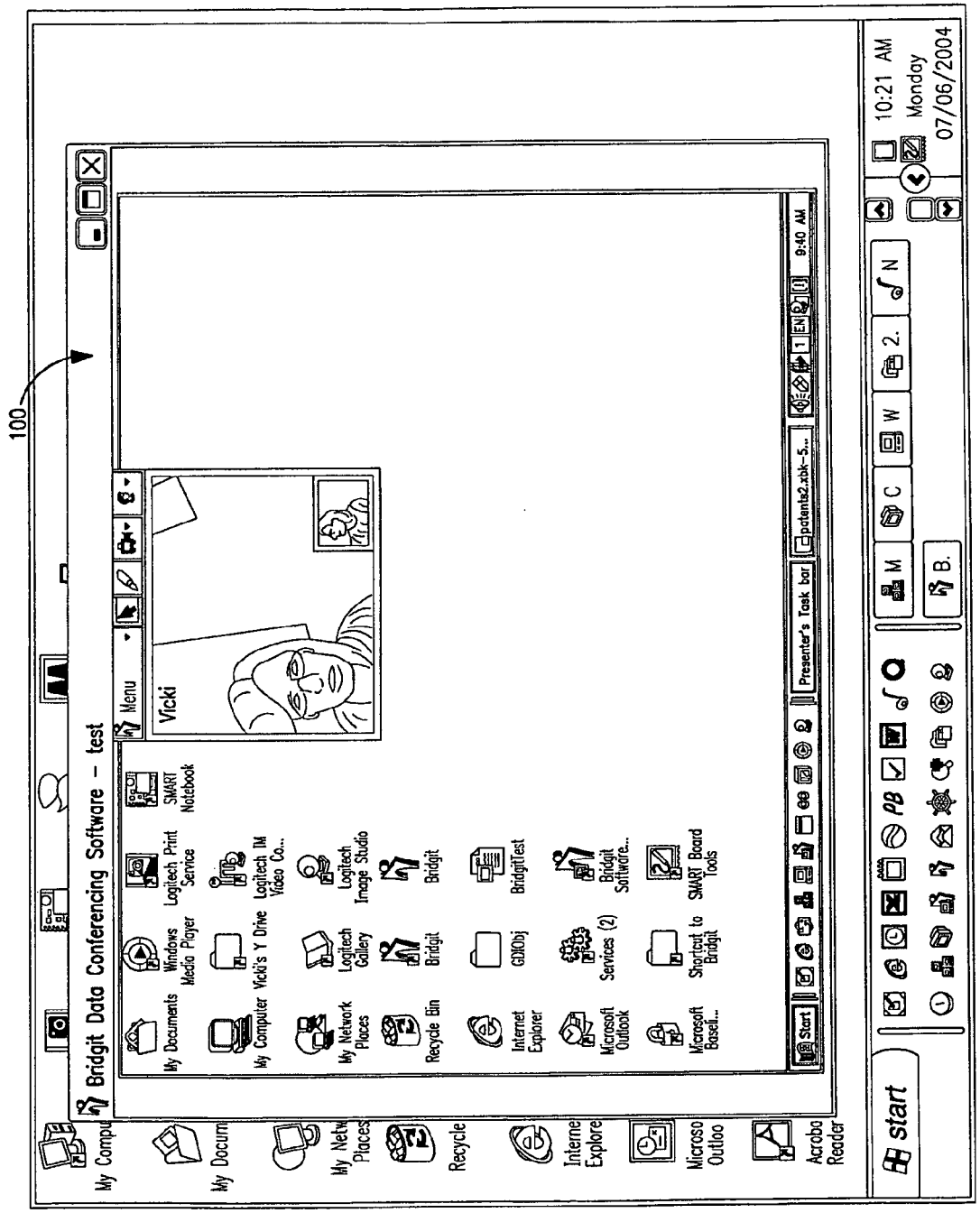
FIG. 6 shows the viewer's GUI wherein web camera ("webcam") video is being displayed in a frame and a sub-frame.

FIG. 6 shows the GUI 100, wherein a viewer has elected to view webcam video. A video frame 184 at least initially shows webcam video from a webcam beside the touch screen of the presenter. A sub-frame 188 initially shows webcam video from a webcam beside a viewer's personal computer. By selecting the sub-frame 188, the viewer can cause the source of webcam video for the sub-frame 188 to be switched with that of the video frame 184. This results in the display of webcam video from the presenter in the sub-frame 188 and the display of webcam video from the viewer in the frame 184. Where there are a number of participants with webcams, a number of sub-frames 188 are provided.

Figure 7:
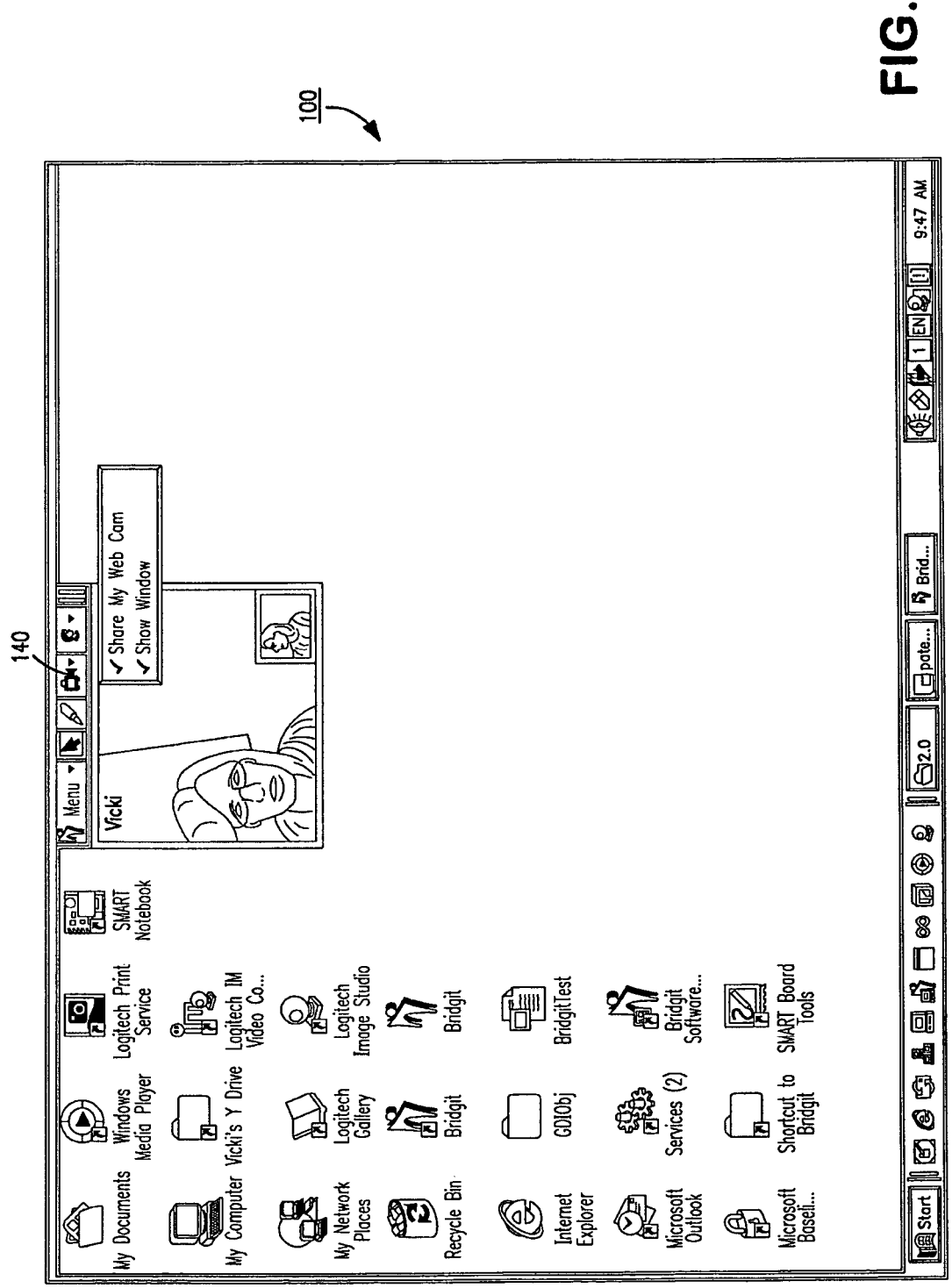
FIG. 7 shows the presenter's GUI includes the webcam video and a webcam menu.

FIG. 7 shows the viewer's GUI 100 when the webcam menu button 140 has been selected to reveal a webcam menu 192. The webcam menu allows a participant to select whether to share his webcam video feed with other participants of the conference and whether to show or hide the video frame 184.

Figure 8:
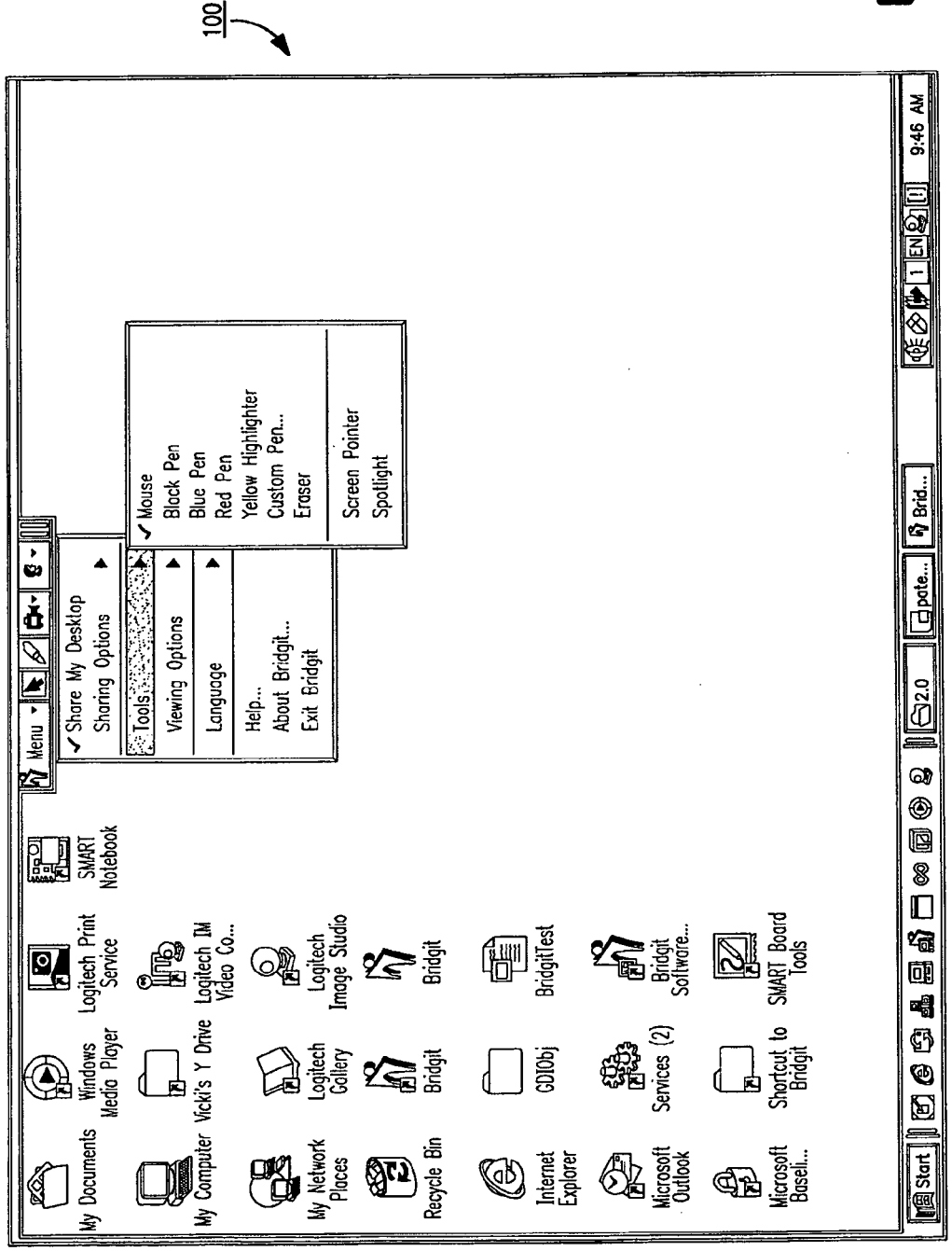
FIG. 8 shows the presenter's GUI with the Tools sub-menu of the main menu revealed.

FIG. 8 shows the GUI 100 displayed to the presenter when the presenter has selected the "Tools" menu item from the main menu button 128. The sub-menu 196 revealed allows the presenter to select how the pointer input should be interpreted by the desktop sharing application. As illustrated, pointer input can be interpreted as mouse pointer movement, as one of a number of pens or markers, as an eraser, as a large arrowhead pointer or as a spotlight.

Figure 9:
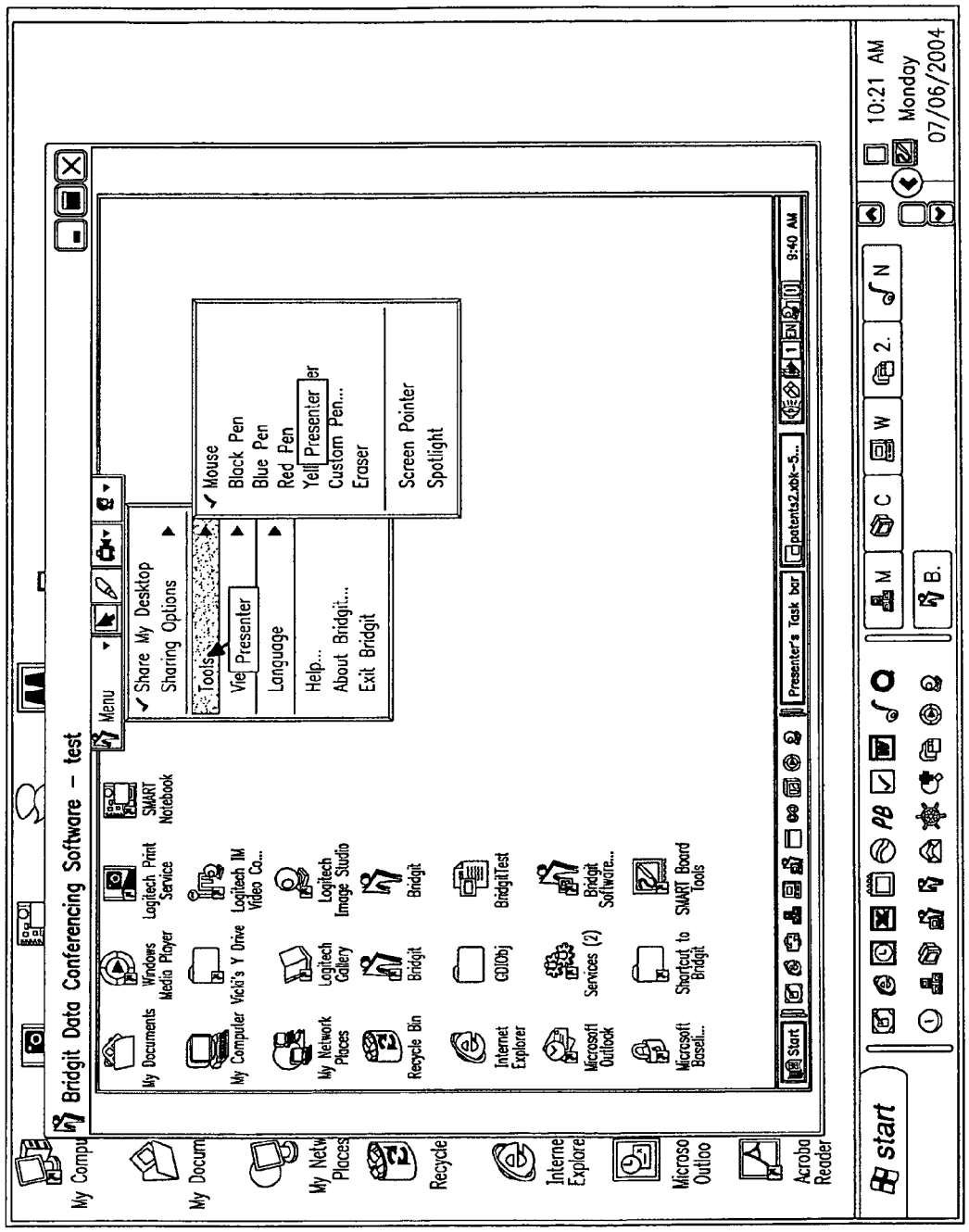
FIG. 9 shows the viewer's GUI corresponding to the presenter's GUI of FIG. 8.

FIG. 9 shows the GUI 100 of FIG. 8 as seen by a viewer. As with the taskbar in FIGS. 3 to 6, the menu and submenu opened by the presenter are hatched to indicate that they are objects with which interaction is not possible.

Figure 10:
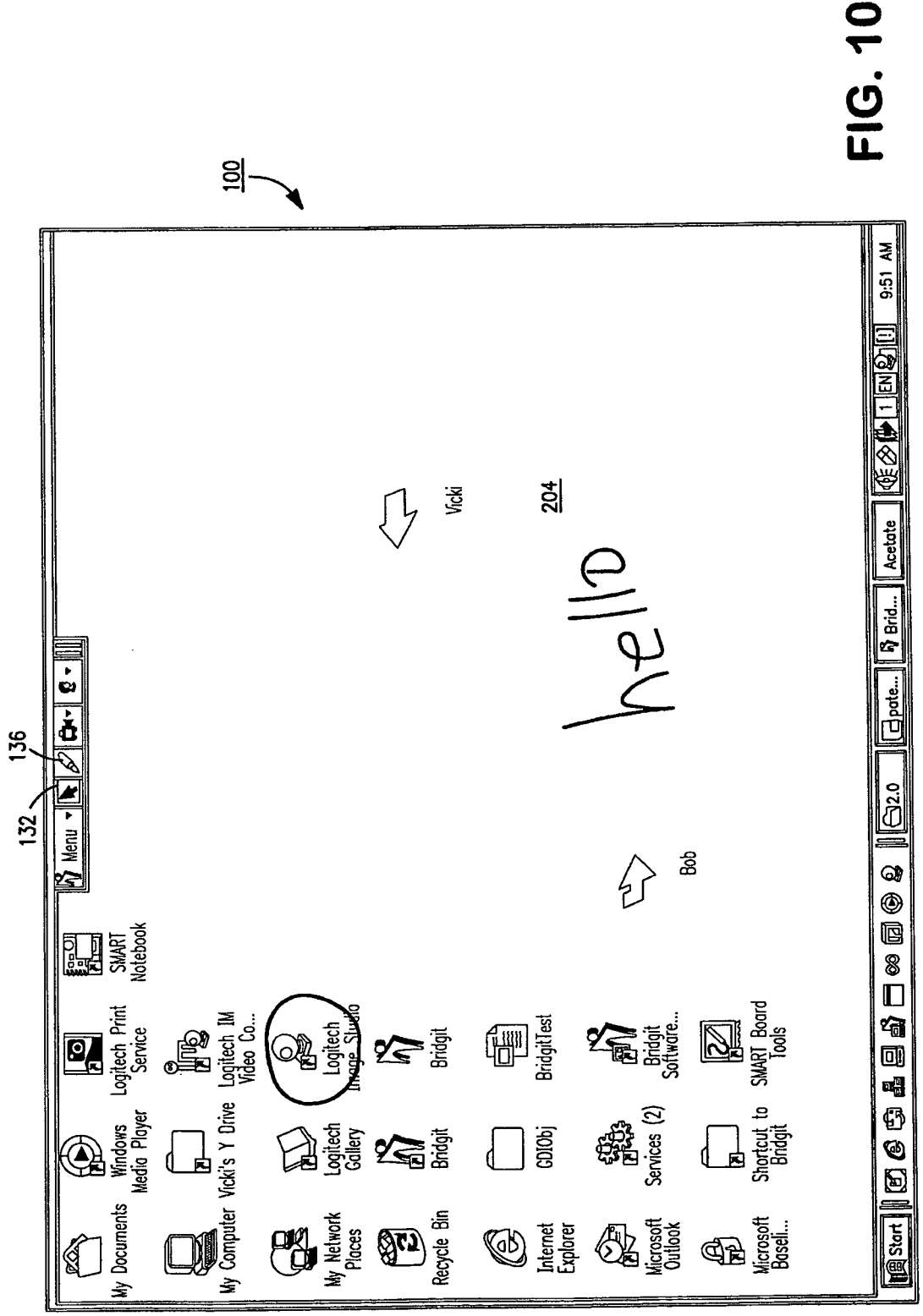
FIG. 10 shows the presenter's GUI wherein two participants are drawing.

FIG. 10 shows the GUI 100 displayed to the presenter wherein the drawing option button 136 has been selected. In this example, an option to permit remote annotation by viewers under the "Sharing Options" sub-menu (not shown) of the main menu has been enabled. The desktop sharing application provides a transparent virtual acetate layer atop the shared region of the desktop that can be drawn on. As the presenter and the viewers annotate, the annotations are received and collectively drawn on the acetate layer. Both drawing 200 made by the presenter and drawing 204 made by a viewer appear on the shared region 116 at the same time, and can permit simultaneous contribution by the presenter and the viewer thus providing a shared area for annotation. Each user is, by default, assigned a distinct color for such drawing. The colors assigned to the participants are identified in the participants list, which can be exposed by selecting the participants list button 144.

In addition, in this example, both the presenter and the viewer have selected "Screen Pointer" from the "Tools" submenu of the main menu. As a result, a labeled arrowhead pointer 208 appears in the shared region 116, the position and orientation of which correspond to the position and last movement direction of the mouse pointer of the presenter. Also, a labeled arrowhead pointer 212 appears in the shared region 116, the position and orientation of which correspond to the position and last movement direction of the mouse pointer of the viewer. Any drawing made in the shared region is scaled accordingly if a participant is viewing the shared region in a reduced-size window.

Figure 11:
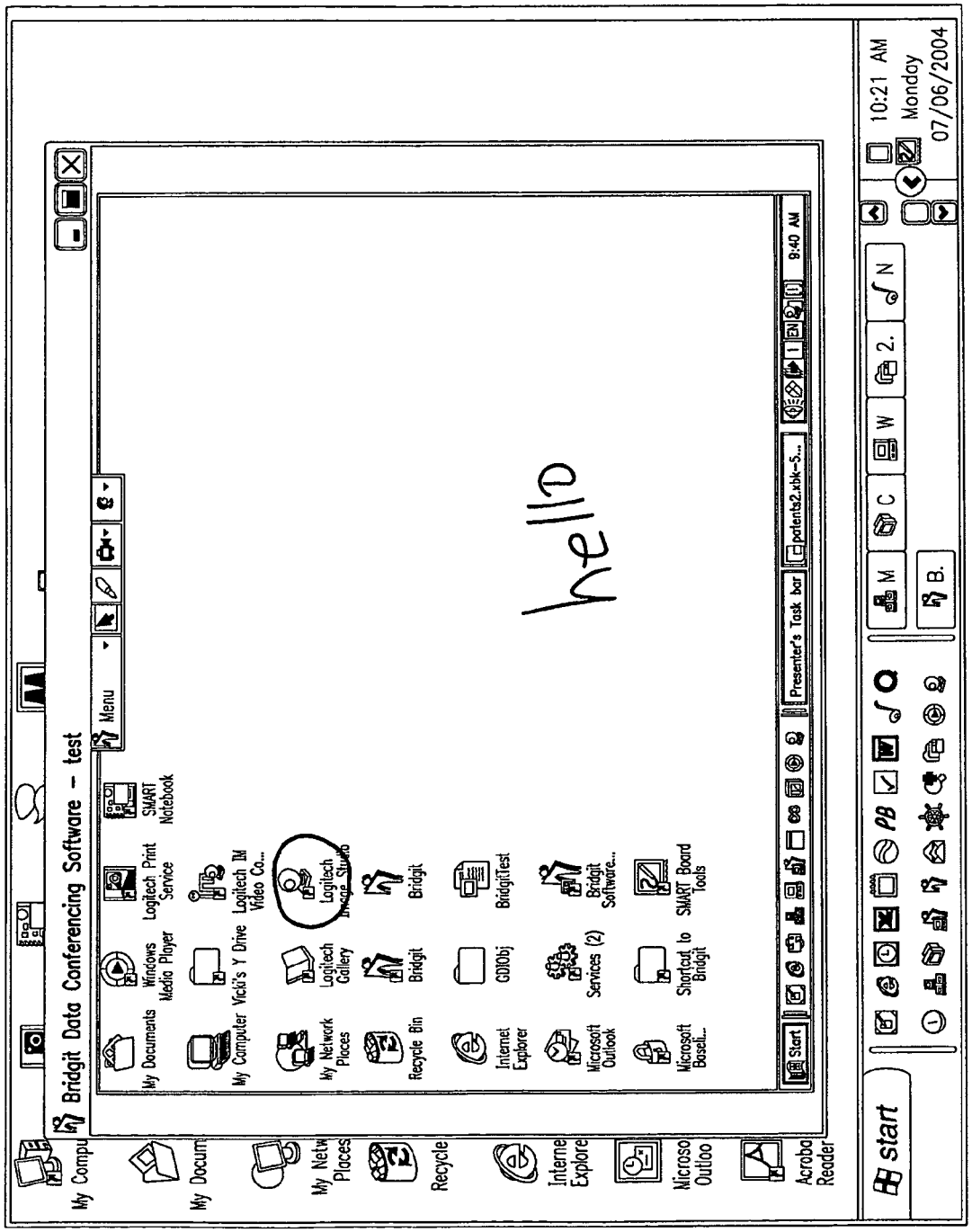
FIG. 11 shows the viewer's GUI corresponding to the presenter's GUI of FIG. 10.
Figure 12:
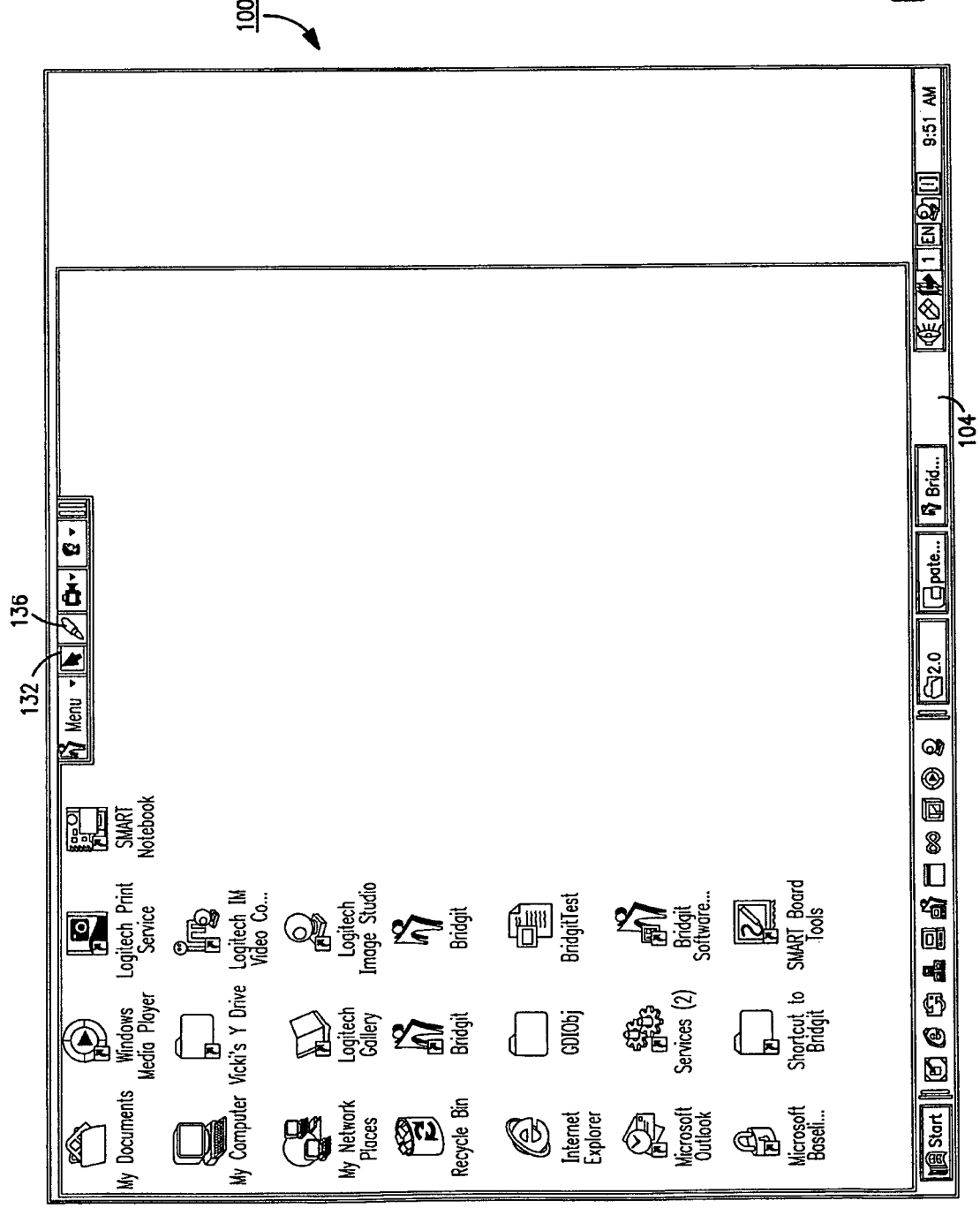
FIG. 12 shows the presenter's GUI after resizing.

FIG. 11 shows the GUI 100 of FIG. 10 as seen by the viewer. FIG. 12 shows the GUI 100 displayed to the presenter after having been resized by dragging the right portion of the frame left partially across the screen and the bottom portion of the frame up partially up the screen. The resulting shared region 116 no longer includes the taskbar 104. In some cases, it may be desirable to only display a portion of the desktop in order to maintain participant focus on a key area of the screen, to hide a portion of the screen which may contain sensitive information, or to reduce the network resource requirements of the desktop sharing application (by reducing the amount of information that is required to be transmitted to each participant). Further, sensitive controls can be hidden or made inaccessible to other participants.

Figure 13:
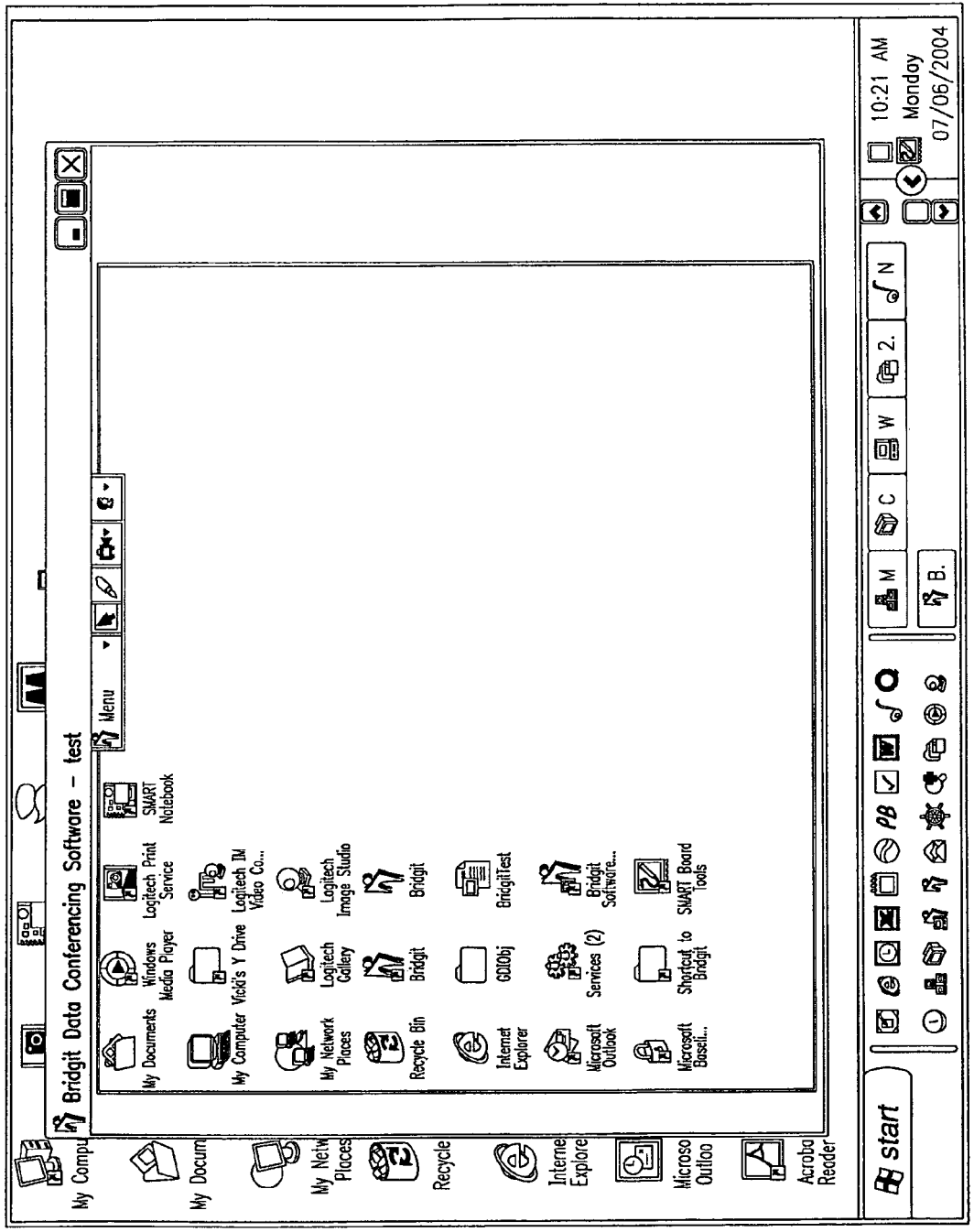
FIG. 13 shows the viewer's GUI corresponding to the resized presenter's GUI of FIG. 12.

FIG. 13 shows the GUI 100 of FIG. 12 as seen by the viewer. As a result of the resize of the shared region, the shared region 116 of the GUI 100 does not include the presenter's taskbar and, thus, is not visible to the viewer.

Figure 14:
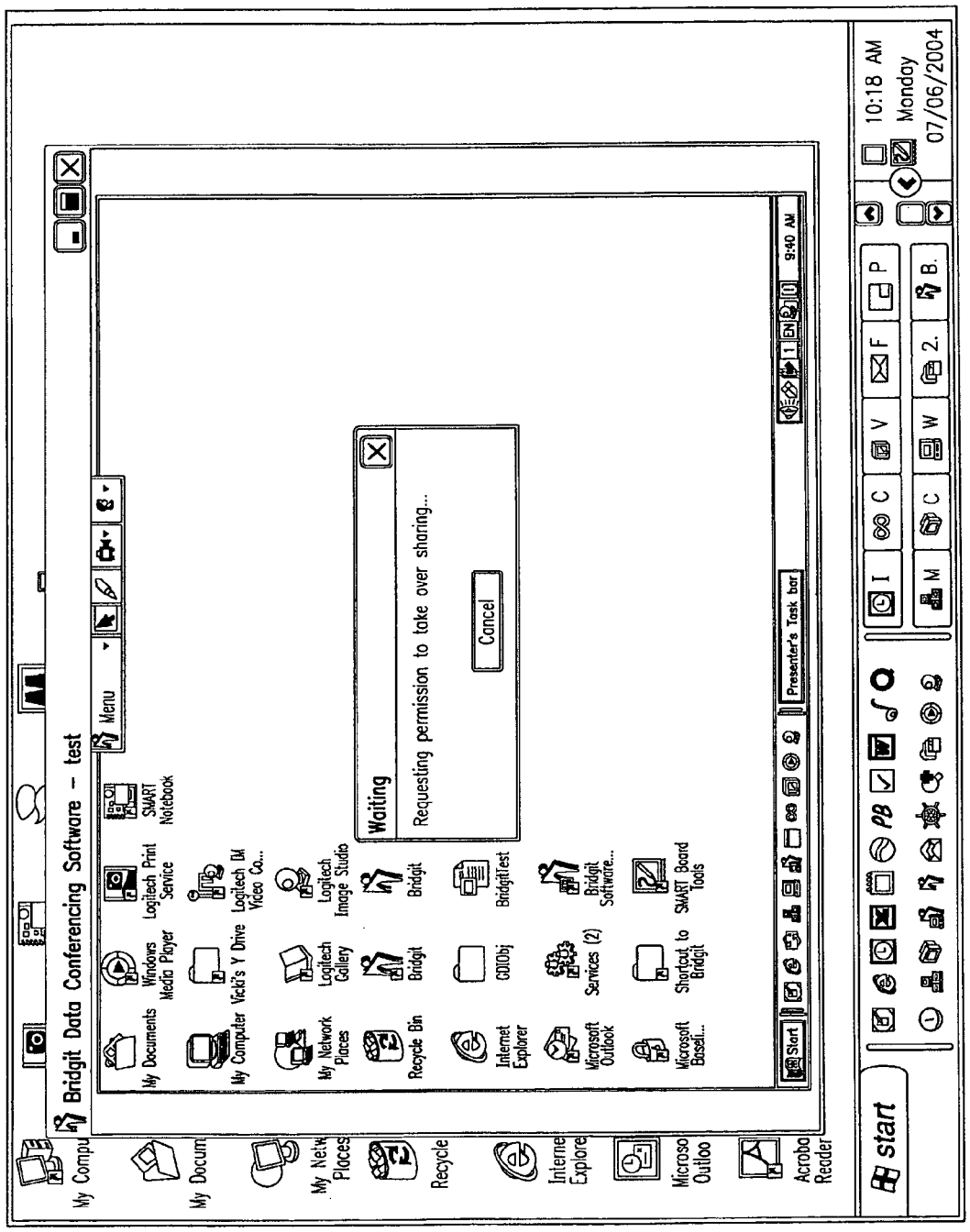
FIG. 14 shows the viewer's GUI, wherein the viewer is waiting to share his desktop.
Figure 15:
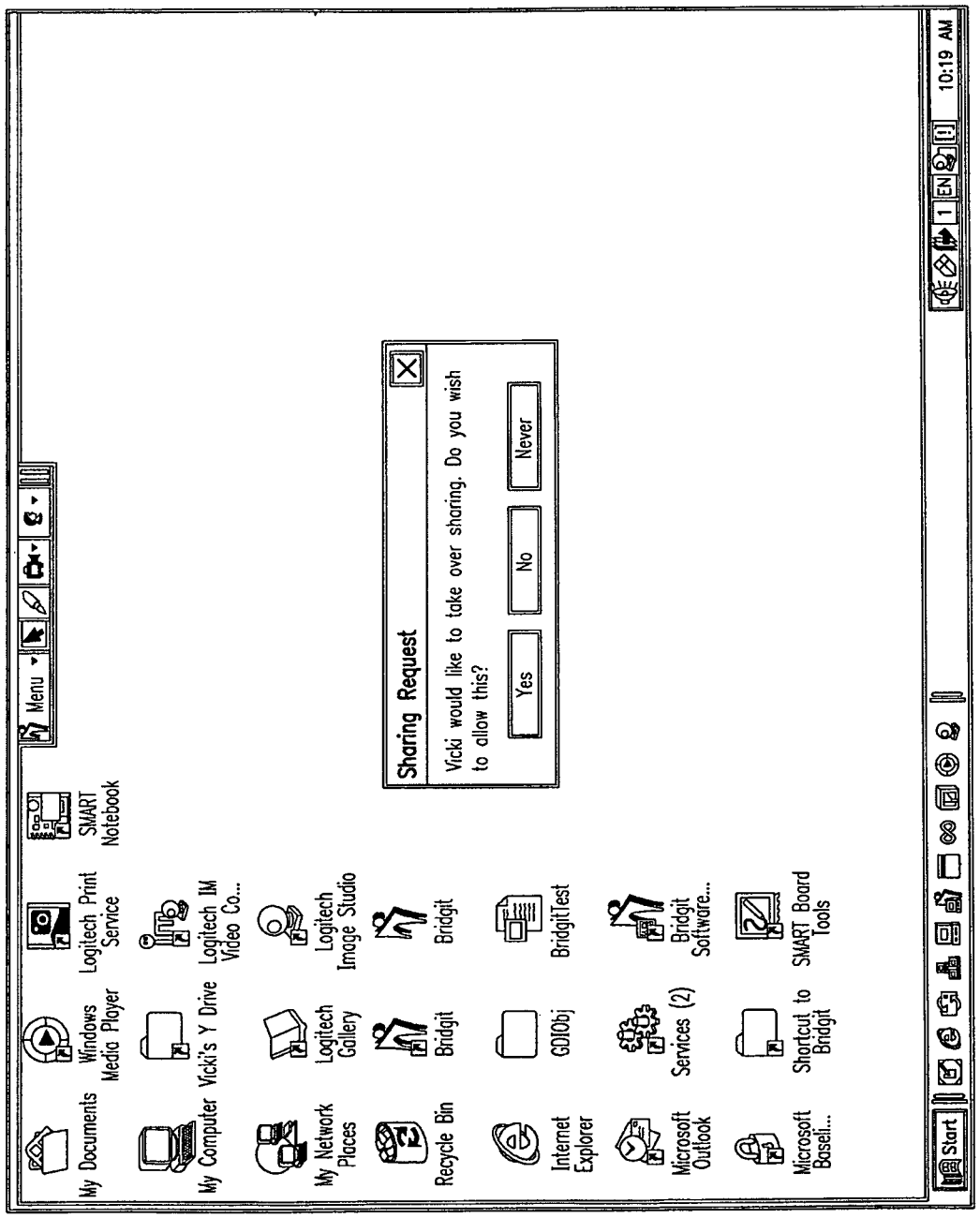
FIG. 15 shows the presenter's GUI of FIG. 2 wherein a dialog box appears to grant permission to the viewer to share his desktop.

The desktop sharing application allows the role of presenter to shift to another participant in the conference. FIG. 14 shows the GUI 100 displayed to a viewer immediately after the viewer has requested to share his desktop. FIG. 15 shows the resulting GUI 100 displayed to the presenter. As can be seen, a dialog box appears to enable the presenter to permit or deny, either temporarily or for the duration of the conference, the viewer's request to share his desktop.

Figure 16:
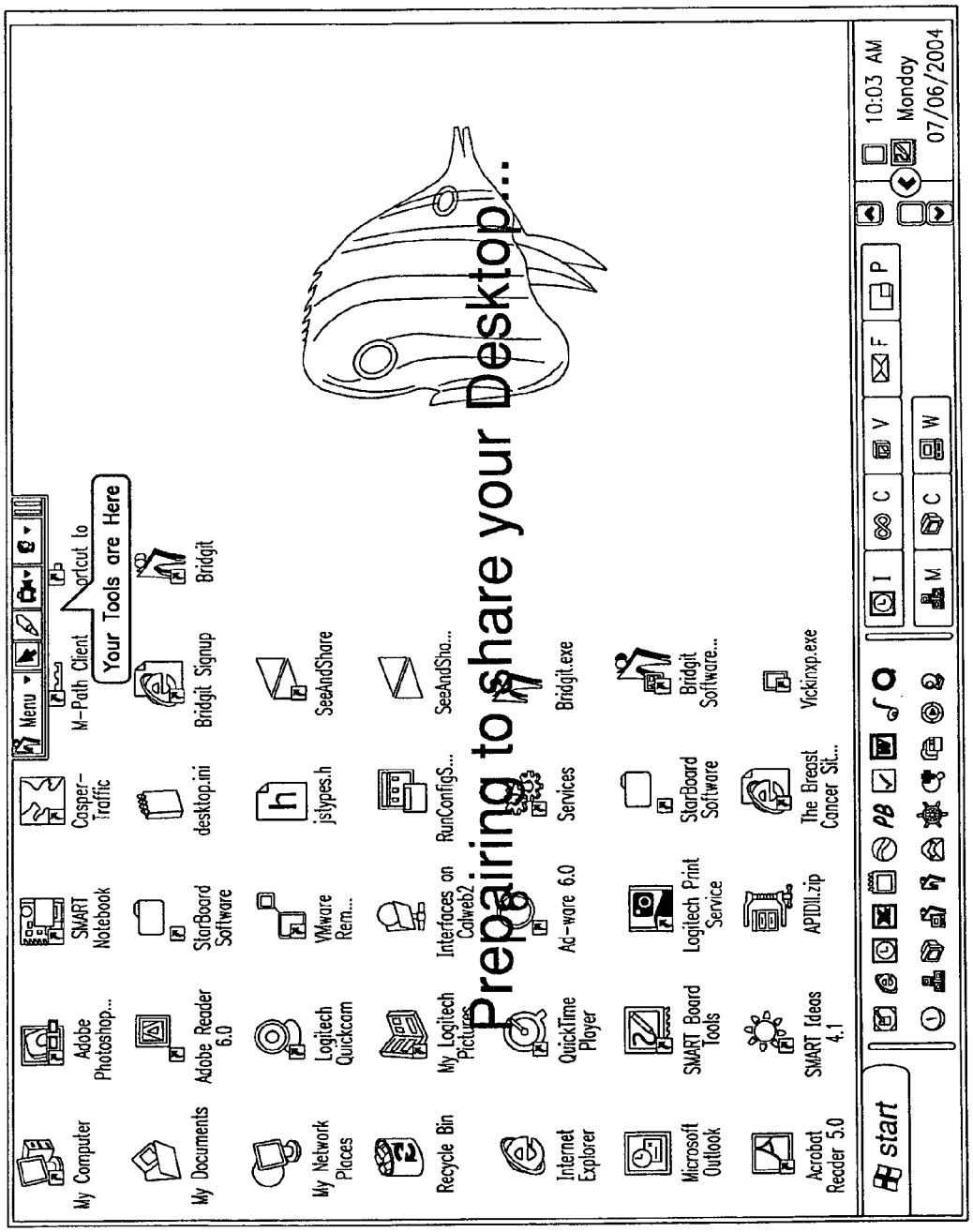
FIG. 16 shows the new presenter's GUI while waiting for desktop sharing to commence.
Figure 17:
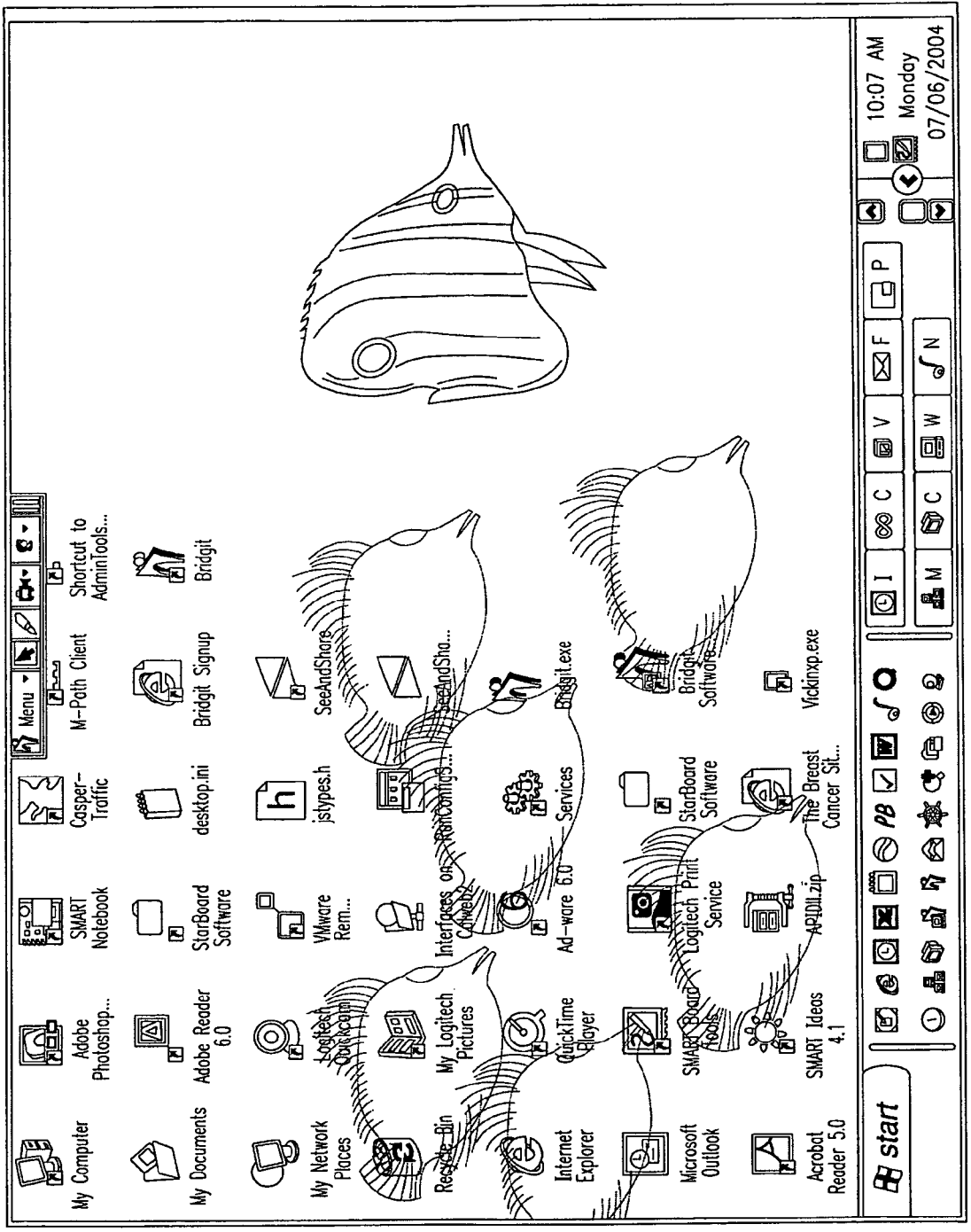
FIG. 17 shows the new presenter's GUI after desktop sharing is assumed.
Figure 18:
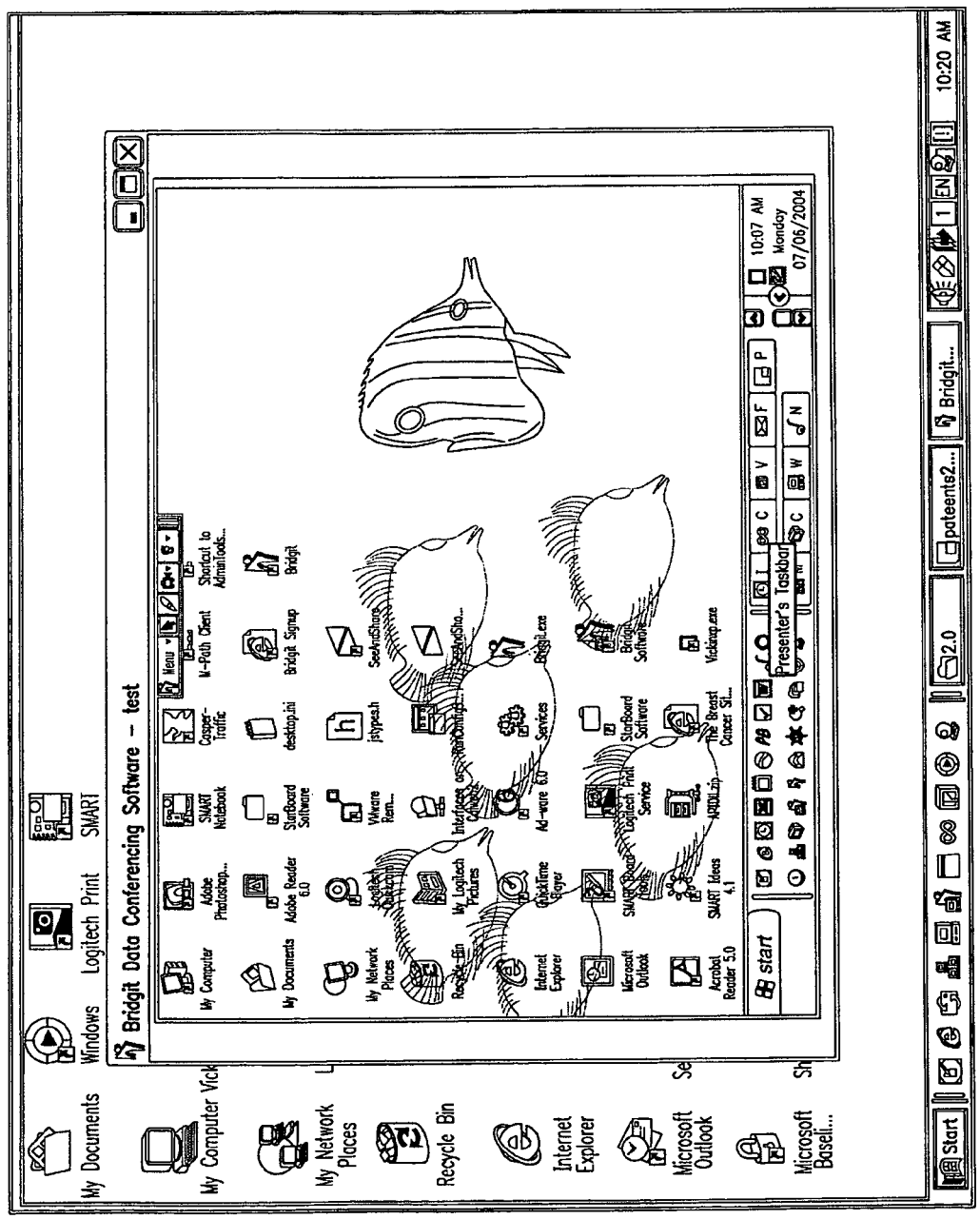
FIG. 18 shows the old presenter's GUI after desktop sharing is assumed.

FIG. 16 shows the GUI 100 displayed to the viewer after the presenter has accepted the viewer's offer to share his desktop. A notification message 220 is displayed in the shared region 116. FIG. 17 shows the GUI 100 displayed to the viewer, now the presenter as a result of the transfer of control of the conference. The resulting GUI 100 displayed to the previous presenter, now a viewer, is shown in FIG. 18.

As network bandwidth is typically the most limited resource in the field of Internet conferencing, the desktop sharing application relies on a number of methods to reduce the amount of data transmitted to and from the conferencing server 48 by the computers 24a, 24b. U.S. patent application Ser. No. 10/888,793, assigned to SMART Technologies Inc. of Calgary, Alberta, Canada discloses methods of reducing data transmissions, and is incorporated by reference in its entirety herein.

A method for enabling remote control of a host computer will now be described. Where a viewer on a client computer has been given remote control access to the host computer, the viewer can interact with the shared region of the presenter's desktop on the host computer. The viewer's mouse events, including button clicking and movement, are handled as if they occurred locally on the presenters computer.

Figure 19:
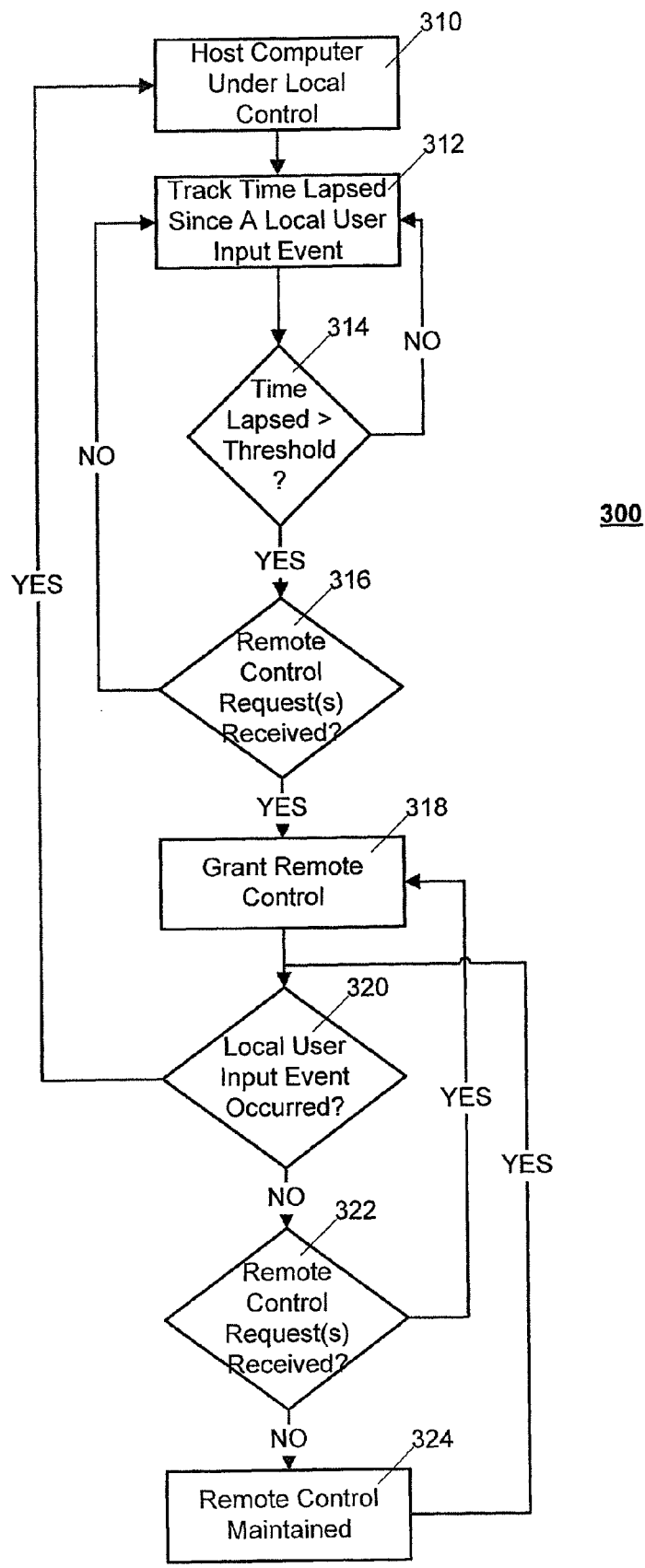
FIG. 19 is a flowchart showing steps in a method for enabling remote control of a host computer by a client computer.
Figure 21:
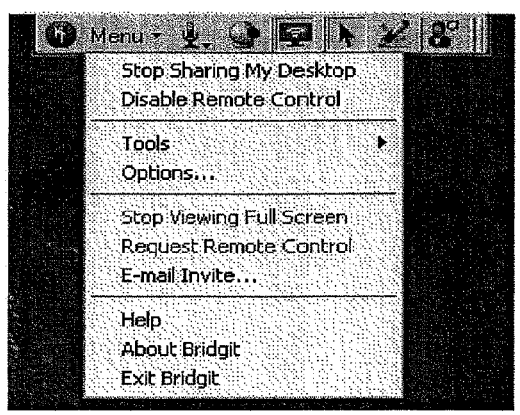
FIG. 21 shows a dropdown menu available on the presenter's GUI with an option for disabling remote control.

FIG. 19 is a flowchart showing steps in the method 300 for enabling remote control of a host computer by a client computer. The method 300 begins with the host computer under local control (step 310). This is the state of the conference session when first initiated. Upon sharing of the local desktop on host computer, remote control is enabled when the host computer automatically transmits a PAUSE (false) message, when its desktop is shared, to the conferencing server 48. It will be understood that the presenter on host computer can select whether to permit remote control and thereby control whether host computer ever sends a PAUSE (false) message to conferencing server. FIG. 21 shows a dropdown menu available on the presenter's GUI with an option for disabling remote control. If remote control has been permitted, then the PAUSE (false) message sent by the host computer enables any client computer during the conference to be granted remote control of the host computer according to certain conditions as will be described hereinafter.

Figure 20:
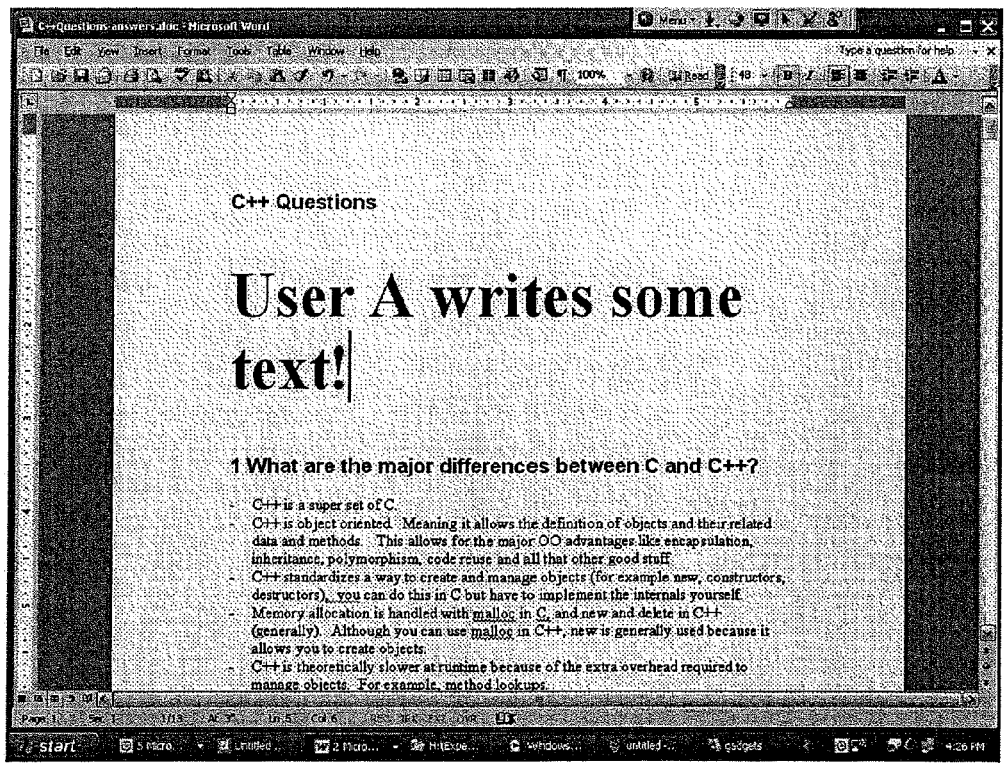
FIG. 20 shows a viewers' GUI during a session in which remote control may be enabled.

FIG. 20 shows a viewers' GUI on a client computer during a session in which remote control may be enabled. The local user of the host computer has written "User A writes some text!" by virtue of local control of the host computer.

Returning to FIG. 19, while under local control, time lapsed since a last local user input event such as a mouse click, keyboard entry or pen entry on the host computer is tracked (step 312) by the host computer. If the time lapsed does not exceed a threshold (step 314), which for the purposes of the following is three (3) seconds but can be another value as appropriate, then tracking of time lapsed continues at step 312. It will be understood that upon the occurrence of a local user input event at the host computer, the time lapsed is reset to zero (0) and a PAUSE (true) message is transmitted by the host computer to the conferencing server 48 to prevent client computers from gaining remote control of the host computer, if the PAUSE (true) message was not just previously sent. Otherwise, if time lapsed has exceeded the threshold, then the host computer informs the conferencing server 48 that remote control is enabled by transmitting a PAUSE (false) message to conferencing server 48.

In the meantime, the conferencing server 48 has been listening for a REMOTE CONTROL request from client computers, which is transmitted when a user clicks with his/her mouse on the shared display region of a client computer.

Figure 25:
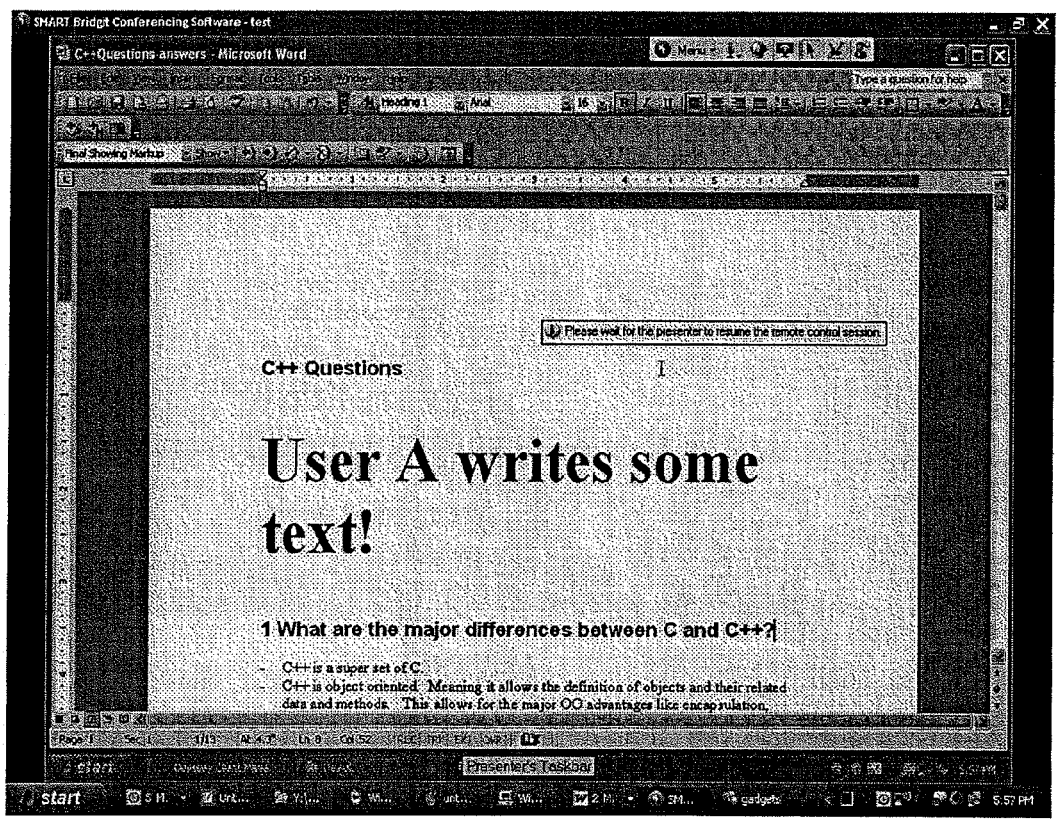
FIG. 25 shows the GUI available to a viewer that has been denied remote control of a host computer.

If a PAUSE (true) message has been received from the host computer, then a REMOTE CONTROL request from a client computer is returned with a DENY message. The client computer is response displays a message to its user that remote control is not currently enabled. For example, the client computer could display a message such as "! Please wait for the presenter to resume the remote control session" as shown in FIG. 25.

If a PAUSE (false) message has been received from the host computer, then upon receipt of the REMOTE CONTROL request, conferencing server 48 sends a REMOTE CONTROL PENDING message to the other client computers in the conference in order to temporarily stop additional REMOTE CONTROL requests. The conferencing server 48 then forwards the REMOTE CONTROL request to the host computer. The host computer immediately approves the request by changing an internal permission ID, and transmitting both a REMOTE CONTROL RESPONSE and a REMOTE CONTROL PERMISSION CHANGE message to the conferencing server 48.

Figure 22:
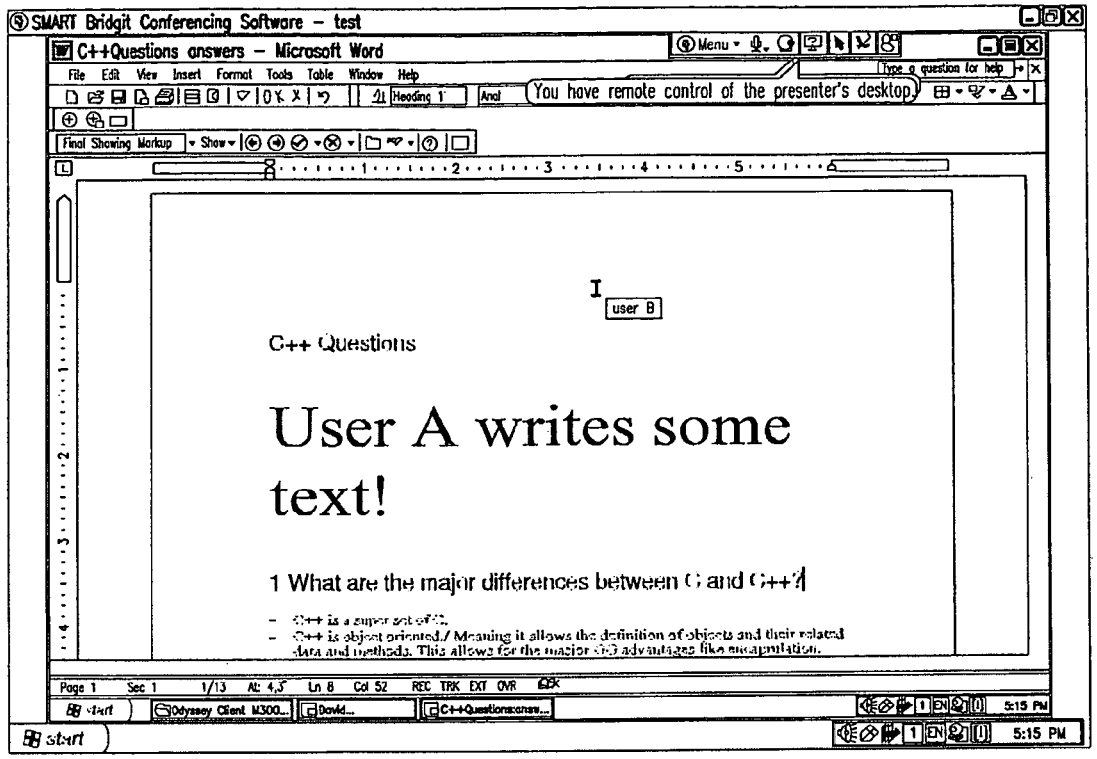
FIGS. 22 to 24 show the GUI available to a viewer that has remote control of a presenter's shared desktop.
Figure 23:
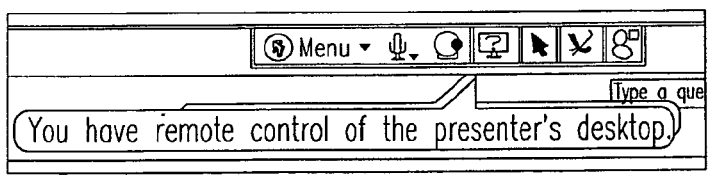
Figure 24:
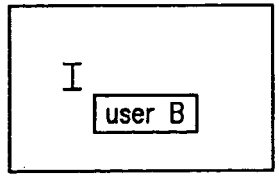

Upon receipt of the REMOTE CONTROL RESPONSE and REMOTE CONTROL PERMISSION CHANGE messages, the conferencing server updates its internal remote control ID, forwards the REMOTE CONTROL PERMISSION CHANGE message to all client computers, and forwards the REMOTE CONTROL RESPONSE message to the requesting client computer to complete the enablement of remote control by the requesting client computer. The REMOTE CONTROL PENDING message is then rescinded in order to allow subsequent requests for and granting of remote control to be completed (step 318). Host computer displays to its user a cursor label with the name of the user on the client computer than has remote control and/or a bubble window adjacent its toolbar interface indicating that a client computer has remote control. FIGS. 22 to 24 show the GUI available to a viewer that has remote control of a presenter's shared desktop. In FIG. 22, there are two indications to indicate to the viewer "User B" that that user has control of the host or presenter's desktop. The two indications are shown isolated and magnified in FIGS. 23 and 24.

The time lapse mechanism for enabling remote control is advantageous in that it mimics the natural 2-5 second pause in conversation that occurs after someone speaks that indicates the floor is open for other speakers/contributors. The time lapse mechanism is more intuitive for users collaborating in a conferencing or other environment than previously-known mechanisms that require the local user of the host computer to click on a dialog box to grant permission to another user to remotely control to host computer. Even with this useful mechanism, the local user of the host computer retains ultimate control over the host computer by being able to adjust conference settings to specify whether remote control of the host computer is enabled at all, and to resume control of the host computer from a remote controller at any time as will be described.

Granting control to only one computer at a time reduces confusion as to what changes are being made on the host computer, and granting remote control automatically to subsequent requestors is done also to better track the natural conversational style of meetings. This is the opposite of other systems that grant control to a first requestor that cannot be transferred simply upon request to a second requester, and in theory enables any conference participant to disrupt any remote user during their contribution. However, in practice it has been found that with the above mechanisms, users follow a natural order of turn-taking, and do not persist in disrupting each other for very long.

Returning to FIG. 19, with control having been granted to the requestor at step 318, remote user input events on the client computer having remote control, such as mouse, keyboard and pen input events, are received at the conferencing server 48 from the remote controller and routed to the host computer. Host computer 48 treats the remote user input events as though they were input locally. During remote control, the host computer continues to listen for local user input events (step 320). It will be understood that, while listening for local user input events has been shown as a serial process for ease of understanding, hardware interrupts may be employed to break the remote control process at any time so as to enable the host computer to resume local control.

In the event that a local user input event occurs, then the host computer resumes local control immediately (step 310) by transmitting a Permission Change message and a PAUSE (true) message. The Permission Change message is transmitted by the conferencing server 48 to all of the client computers in the conference, so as to prevent all clients from remotely controlling the host computer. As can be seen, the user of the host computer is able to resume local control of the host computer at any time, and does not have to request control from the remote user. If at step 320 no local user input event has occurred, then it is determined whether requests for remote control have been received from other client computers (step 322). If requests for remote control have been received from other client computers, then remote control is immediately granted as described above (step 318), and keyboard, mouse and pen input events are routed from the new remote controller to the host computer via the conference server 48. This mechanism enables remote control of the host computer to be transferred rapidly between meeting participants, so as to enable participants to make changes on the host computer at the speed of the meeting and with little overhead. If no requests for remote control have been received, then remote control is maintained by the current remote controller (step 324). It will be understood that at any time during remote control, should a local user input event be received at the host computer, then local control of the host computer is resumed as described above.

While the transfer of remote control from one client computer to a requesting client computer has been described above as generally immediate upon request, alternatives are possible. For example, transfer of remote control may only be enabled in the event that time tracked since a remote user input event on the current remote controller has exceeded the three (3) second threshold, or another appropriate threshold. This is similar to the enabling of remote control as described above when the host computer has not received any local user input event for a threshold time.

The above has been described for use with a conferencing system including routing remote control commands via a central conferencing server 48 such as that provided by the Bridgit technology offered by SMART Technologies Inc. of Calgary, Alberta, Canada. It will be understood that the method described is also applicable to other network architectures, such as peer-to-peer or similar.

The method described above for establishing a communications session and described methods may be implemented in whole or in part by program modules including but not limited to routines, programs, object components, data structures etc., and may be embodied as computer readable program code stored on a computer readable medium. The computer readable medium is any data storage device that can store data, which can thereafter be read by a computer system. Examples of computer readable medium include for example read-only memory, random-access memory, USB keys, Flash Memory (such as SD cards), CD-ROMs, DVR-ROMs, magnetic tape and optical data storage devices. The computer readable program code can also be distributed over a network including coupled computer systems so that the computer readable program code is stored and executed in a distributed fashion.

The above-described embodiments of the invention are intended to be examples of the present invention and alterations and modifications may be effected thereto, by those of skill in the art, without departing from the scope of the invention which is defined solely by the claims appended hereto.

What is claimed is:

1. In a distributed computer network where displayed information is shared between (i) at least a host computer having a display region that is to be shared and (ii) a client computer, a method of enabling remote control of the host computer by the client computer, the method comprising:
    while the host computer is under local control, disabling remote control of the host computer by the client computer and tracking time lapsed since a local user input event has occurred at the host computer;
    in the event that the time lapsed exceeds a threshold, enabling remote control of the host computer by the client computer; and
    automatically resuming local control of the host computer immediately upon the occurrence of any new local user input event subsequent to the enabling remote control while still sharing the display region with the client computer,
    wherein remote annotations drawn over the display region at the client computer are displayed at the host computer; and local annotations drawn over the display region at the host computer are displayed simultaneously with the remote annotations.

2. The method of claim 1, comprising: transferring remote control to another client computer.

3. The method of claim 2, wherein transferring remote control to another client computer is enabled only in the event that time lapsed since a remote user input event at the client computer exceeds the threshold.

4. The method of claim 3, wherein transferring of remote control occurs immediately upon the occurrence of a request from the other client computer.

5. The method of claim 1, comprising: in the event that remote control is not enabled, displaying a message at a requesting client computer indicating that remote control is not currently enabled.

6. The method of claim 1, wherein a request for remote control is provided by mouse clicking on the shared display region being displayed on a client computer.

7. The method of claim 1, comprising: displaying a notification message at the host computer that another computer is remotely controlling the host computer.

8. The method of claim 1, wherein the local user input event is a mouse activity event, keyboard activity event, or pen activity event.

9. The method of claim 7, wherein the notification message is at least one of a cursor label and a bubble window adjacent the toolbar interface on the host computer.

10. The method of claim 1, further comprising enabling a user on the host computer to pause and unpause remote control of the host computer.

11. A non-transitory computer readable medium embodying a computer program for a desktop sharing application dynamically conditionable between a host mode, wherein a shared display region displays a shared region of the desktop of a host computer upon which the desktop sharing application is executing, and a client mode, wherein the shared display region displays a shared region of the desktop of a client computer executing the desktop sharing application conditioned in host mode with which the sharing application is in communication;
    the computer program comprising:
    computer program code for defining the shared display region;
    computer program code for tracking time lapsed since a local user input event on the host computer in the host mode; and
    computer program code for enabling remote control of the host computer by a client computer in the event that time lapsed exceeds a threshold; and
    computer program code for automatically resuming local control of the host computer immediately upon the occurrence of any one of a plurality of new local user input events subsequent to the enabling remote control while still sharing the display region with the client computer,
    wherein remote annotations drawn over the display region at the client computer are displayed at the host computer; and local annotations drawn over the display region at the host computer are displayed simultaneously with the remote annotations.

\* \* \* \* \*